United States Patent
Shiragaki

(10) Patent No.: US 6,211,983 B1
(45) Date of Patent: Apr. 3, 2001

(54) OPTICAL COMMUNICATION NETWORK UNIT COMPRISING AN OPTICAL SIGNAL CONVERTING APPARATUS AND/OR AN OPTICAL SIGNAL RECEIVING APPARATUS

(75) Inventor: Tatsuya Shiragaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/061,364

(22) Filed: Apr. 16, 1998

(30) Foreign Application Priority Data

Apr. 16, 1997 (JP) .................................................. 9-099236

(51) Int. Cl.⁷ .................................................. H04B 10/00
(52) U.S. Cl. .......................... 359/154; 359/162; 359/179; 359/127; 359/326
(58) Field of Search .................................. 359/124, 127, 359/118, 154, 162, 179, 326, 173

(56) References Cited

U.S. PATENT DOCUMENTS

| | | | |
|---|---|---|---|
| 5,386,314 | * | 1/1995 | Jopson .................................. 359/326 |
| 5,978,129 | * | 11/1999 | Jourdan et al. ....................... 359/326 |
| 6,046,841 | * | 4/2000 | Mahgerefteh ......................... 359/326 |

FOREIGN PATENT DOCUMENTS 2-306226 12/1990 (JP) .
7-301830 11/1995 (JP) .

OTHER PUBLICATIONS

J. Zhou, et al., "Four-Wave Mixing Wavelength Conversion Efficiency in Semiconductor Traveling-Wave Amplifiers Measured to 65 nm of Wavelength Shift", IEEE Photonics Technology Letters, vol. 6, No. 8, Aug. 1994, pp. 984–987.

C. Joergensen, et al., "40 Bbit/s All-Optical Wavelength Conversion by Semiconductor Optical Amplifiers", Electronics Letters, vol. 32, No. 4, Feb. 15, 1996, pp. 367–368.

* cited by examiner

*Primary Examiner*—Kinfe-Michael Negash
(74) *Attorney, Agent, or Firm*—Ostrolenk, Faber, Gerb & Soffen, LLP

(57) ABSTRACT

In an optical signal receiving apparatus, an electrical switch is turned on to put a semiconductor laser into an oscillating state to invert an input optical signal. Mutual gain modulation is carried out in a semiconductor optical amplifier due to the input optical signal. A transmission wavelength of a variable wavelength optical filter is matched with an oscillation wavelength of the semiconductor laser and then an inverted optical signal is supplied to an optical receiving unit. If the input optical signal is not be inverted, the electrical switch is turned off to put the semiconductor laser into an unoscillating state. The semiconductor optical amplifier only carries out optical amplification without the mutual gain modulation. The transmission wavelength of the variable wavelength optical filter is matched with an input wavelength of the input optical signal and a noninverted optical signal is supplied to the optical receiving unit.

23 Claims, 20 Drawing Sheets

OPTICAL COMMUNICATION NETWORK UNIT COMPRISING AN OPTICAL SIGNAL CONVERTING APPARATUS AND/OR AN OPTICAL SIGNAL RECEIVING APPARATUS

BACKGROUND OF THE INVENTION

This invention relates to an optical communication network unit and, more particularly, to an optical signal converting apparatus and an optical signal receiving apparatus for use in the optical communication network unit.

As is well known in the art, it is possible for optical communication to make a transmission capacity for a single optical transmission path larger by carrying out a wavelength multiplexing on a plurality of optical signals. However, it is impossible to multiplex a plurality of optical signals each of which has the same wavelength into a multiplexed optical signal. This is because it is impossible to demultiplex or separate the multiplexed optical signal having a single wavelength into a plurality of multiplexed or separated optical signals. For this purpose, it is necessary to carry out wavelength conversion in a case of multiplexing a plurality of optical signals each of which has the same wavelength.

A wavelength conversion device converts an input optical signal having an input wavelength into an output optical signal having an output wavelength. Among wavelength conversion devices, wavelength conversion devices for digital modulated optical signals are classified into a noninverting wavelength conversion device and an inversion wavelength conversion device. The noninverting wavelength conversion device is a conversion device where the output optical signal has bit logic which is equal to that of the input optical signal. On the other hand, the inverting wavelength conversion device is a conversion device where the output optical signal has bit logic which is obtained by inverting bit logic of the input optical signal. If desired, reference should be made to any relevant publication that is most readily available. An example of such publications is an article contributed by J. Zhou et al. to IEEE PHOTONICS TECHNOLOGY LETTERS, VOL. 6, NO. 8, AUGUST 1994, pages 984–987, under the title of "Four-Wave Mixing Wavelength Conversion Efficiency in Semiconductor Traveling-Wave Amplifiers Measured to 65 nm of Wavelength Shift."

As an example of noninverting wavelength conversion, a wavelength conversion using four-wave mixing in a semiconductor laser is cited. As an instance of inverting wavelength conversion, a wavelength conversion device using mutual gain modulation in a semiconductor optical amplifier is cited. An instance of the inverting wavelength conversion device is disclosed in an article which is contributed by C. Joergensen et al. to ELECTRONICS LETTERS, Vol. 32, No.4 (Feb. 15, 1996), pages 367–368, and which has a title of "40 Gbit/s All-Optical Wavelength Conversion by Semiconductor Optical Amplifiers."

As described above, inasmuch as there are the inverting wavelength conversion device and the noninverting wavelength conversion device, there are two types of optical signals which are transmitted in an optical communication network system. That is, a first type of optical signal is an optical signal whose bit logic is inverted while a second type of optical signal is an optical signal whose bit logic is not inverted. The former is called an inverted optical signal and the latter is referred to as a noninverted optical signal. Accordingly, an optical receiving unit in the communication network system may be supplied with, as an input optical signal, either the inverted optical signal or the noninverted optical signal.

In the manner which will later be described in conjunction with FIGS. 1 and 2, each of a conventional optical signal receiving apparatus and a conventional optical signal converting apparatus comprises an optical branching unit and an optical switch. As a result, each of the conventional optical signal receiving apparatus and the conventional optical signal converting apparatus is disadvantageous in that it results in having a larger mounted space and in increasing cost of product.

SUMMARY OF THE INVENTION

It is therefore an object of this invention to provide an optical signal converting apparatus, which is capable of reducing a mounted space.

It is another object of this invention to provide an optical signal converting apparatus of the type described, which is capable of reducing cost of product.

It is still another object of this invention to provide an optical signal receiving apparatus, which is capable of reducing a mounted space.

It is yet another object of this invention to provide an optical signal receiving apparatus of the type described, which is capable of reducing cost of product.

It is a further object of this invention to provide an optical communication network node which is provided with the optical signal converting apparatus and/or the optical signal receiving apparatus.

Other objects of this invention will become clear as the description proceeds.

According to a first aspect of this invention, an optical signal converting apparatus converts an input optical signal having an input wavelength into an output optical signal having an output wavelength. The optical signal converting apparatus comprises an optical oscillator for oscillating an oscillation optical signal having an oscillation wavelength. Supplied with the input optical signal and connected to the optical oscillator, an optical coupler optically coupling the input optical signal and the oscillation optical signal to produce a coupled optical signal. Connected to the optical coupler, an optical amplifier optically amplifies the coupled optical signal into an amplified optical signal. The optical amplifier optically amplifies an optical signal having the input wavelength in the coupled optical signal as is. The optical amplifier optically amplifies another optical signal having the oscillation wavelength in the coupled optical signal with bit logic in the optical signal having the input wavelength inverted. Set with a transmission wavelength and connected to the optical amplifier, an optical filter optically filters the amplified optical signal so as to transmit, as a transmitted optical signal, an optical signal having the transmission wavelength in the amplified optical signal. Connected to the optical oscillator, a mode setting arrangement sets a mode for the optical oscillator in one of an active mode for making the optical oscillator supply the oscillation optical signal to an output and an inactive mode for stopping the optical oscillator from supplying the oscillation optical signal as an output. The transmitted optical signal is produced as the output optical signal.

According to a second aspect of this invention, an optical signal receiving apparatus receives an input optical signal having an input wavelength to produce reception data. The optical signal receiving apparatus comprises an optical oscillator for oscillating an oscillation optical signal having an oscillation wavelength. Supplied with the input optical signal and connected to the optical oscillator, an optical coupler optically couples the input optical signal and the oscillation optical signal to produce a coupled optical signal. Connected to the optical coupler, an optical amplifier optically amplifies the coupled optical signal into an amplified optical signal. The optical amplifier optically amplifies an optical signal having the input wavelength in the coupled optical signal as is. The optical amplifier optically amplifies another optical signal having the oscillation wavelength in the coupled optical signal with bit logic in the optical signal having the input wavelength inverted. Set with a transmission wavelength and connected to the optical amplifier, an optical filter optically filters the amplified optical signal so as to transmit, as a transmitted optical signal, an optical signal having the transmission wavelength in the amplified optical signal. Connected to the optical filter, an optical receiving unit receives the transmitted optical signal to produce the reception data. Connected to the optical oscillator, a mode setting arrangement sets a mode for the optical oscillator in one of an active mode for making the optical oscillator supply the oscillation optical signal to an output and an inactive mode for stopping the optical oscillator from supplying the oscillation optical signal as an output.

According to a third aspect of this invention, an optical signal converting apparatus converts an input optical signal having an input wavelength into an output optical signal having an output wavelength. The optical signal converting apparatus comprises an optical oscillator for oscillating an oscillation optical signal having an oscillation wavelength. Supplied with the input optical signal and connected to the optical oscillator, an optical coupler optically couples the input optical signal and the oscillation optical signal to produce a coupled optical signal. Connected to the optical coupler, an optical amplifier optically amplifies the coupled optical signal into an amplified optical signal. The optical amplifier optically amplifies an optical signal having the input wavelength in the coupled optical signal as is. The optical amplifier optically amplifies another optical signal having the oscillation wavelength in the coupled optical signal with bit logic in the optical signal having the input wavelength inverted. Set with a transmission wavelength and connected to the optical amplifier, an optical filter optically filters the amplified optical signal so as to transmit, as a transmitted optical signal, an optical signal having the transmission wavelength in the amplified optical signal. The transmitted optical signal is produced as the output optical signal.

According to a fourth aspect of this invention, an optical signal receiving apparatus receives an input optical signal having an input wavelength to produce reception data. The optical signal receiving apparatus comprises an optical oscillator for oscillating an oscillation optical signal having an oscillation wavelength. Supplied with the input optical signal and connected to the optical oscillator, an optical coupler optically couples the input optical signal and the oscillation optical signal to produce a coupled optical signal. Connected to the optical coupler, an optical amplifier optically amplifies the coupled optical signal into an amplified optical signal. The optical amplifier optically amplifies an optical signal having the input wavelength in the coupled optical signal as is. The optical amplifier optically amplifies another optical signal having the oscillation wavelength in the coupled optical signal with bit logic in the optical signal having the input wavelength inverted. Set with a transmission wavelength and connected to the optical amplifier, an optical filter optically filters the amplified optical signal so as to transmit, as a transmitted optical signal, an optical signal having the transmission wavelength in the amplified optical signal. Connected to the optical filter, an optical receiving unit receives the transmitted optical signal to produce the reception data.

According to a fifth aspect of this invention, an optical signal converting apparatus converts an input optical signal having an input wavelength into an output optical signal having an output wavelength. The optical signal converting apparatus comprises an optical oscillating and amplifying arrangement supplied with the input optical signal. The optical oscillating and amplifying arrangement oscillates an oscillation optical signal having an oscillation wavelength. The optical oscillating and amplifying arrangement is for optically amplifying the input optical signal as is and is for optically amplifying the oscillation optical signal with bit logic in the input optical signal inverted to produce an amplified optical signal. Set with a transmission wavelength and connected to the optical oscillating and amplifying means, an optical filter optically filters the amplified optical signal so as to transmit, as a transmitted optical signal, an optical signal having the transmission wavelength in the amplified optical signal. Connected to the optical oscillating and amplifying arrangement, a mode setting arrangement sets a mode for the optical oscillating and amplifying arrangement in one of an active mode for making the optical oscillating and amplifying arrangement supply the oscillation optical signal to an output and an inactive mode for stopping the optical oscillating and amplifying arrangement from supplying the oscillation optical signal as an output. The transmitted optical signal is produced as the output optical signal.

According to a sixth aspect of this invention, an optical communication network node comprises an information transmitting arrangement for transmitting transmission information related to monitoring and controlling for a main optical signal. An information receiving arrangement receives reception information related to monitoring and controlling for the main optical signal. Connected to the information transmitting arrangement and the information receiving arrangement, an information processing unit processes the reception information to produce a conversion instruction signal indicative of inverting/noninverting of bit logic for the main optical signal and a reception instruction signal indicative of inverting/noninverting of bit logic for the main optical signal. The information processing unit supplies the information transmitting arrangement with the transmission information. Supplied with the main optical signal as an input optical signal having an input wavelength and connected to the information processing unit, an optical signal converting apparatus converts the input optical signal into an output optical signal having an output wavelength in response to the conversion instruction signal. Responsive to the conversion instruction signal, the optical signal converting apparatus carries out a switching operation between the inverting and the noninverting of the bit logic for the main optical signal. Supplied with the main optical signal as the input optical signal having the input wavelength and connected to the information processing unit, an optical signal receiving apparatus receives the input optical signal in response to the reception instruction signal to produce reception data. Responsive to the reception instruction signal, the optical signal receiving apparatus carries out a switching operation between the inverting and the noninverting of said bit logic for the main optical signal.

According to a seventh aspect of this invention, an optical communication network node comprises an information transmitting arrangement for transmitting transmission information related to monitoring and controlling for a main optical signal and an information receiving arrangement for receiving reception information related to monitoring and controlling for the main optical signal. Connected to the information transmitting arrangement and the information receiving arrangement, an information processing unit processes the reception information to produce an instruction signal indicative of inverting/noninverting of bit logic for the main optical signal. The information processing unit supplies the information transmitting arrangement with the transmission information. Supplied with the main optical signal as an input optical signal having an input wavelength and connected to the information processing unit, an optical signal converting apparatus optically converts the input optical signal into an output optical signal having an output wavelength in response to the instruction signal. Responsive to the instruction signal, the optical signal converting apparatus carries out a switching operation between the inverting and the noninverting of the bit logic for the main optical signal.

According to an eighth aspect of this invention, an optical communication network node comprises an information transmitting arrangement for transmitting transmission information related to monitoring and controlling for a main optical signal and an information receiving arrangement for receiving reception information related to monitoring and controlling for the main optical signal. Connected to the information transmitting arrangement and the information receiving arrangement, an information processing unit processes the reception information to produce an instruction signal indicative of inverting/noninverting of bit logic for the main optical signal. The information processing unit supplies the information transmitting arrangement with the transmission information. Supplied with the main optical signal as the input optical signal having the input wavelength and connected to the information processing unit, an optical signal receiving apparatus receives the input optical signal in response to the instruction signal to produce reception data. Responsive to the instruction signal, the optical signal receiving apparatus carries out a switching operation between the inverting and the noninverting of the bit logic for the main optical signal.

DESCRIPTION OF THE PREFERRED EMBODIMENTS

Figure 1:
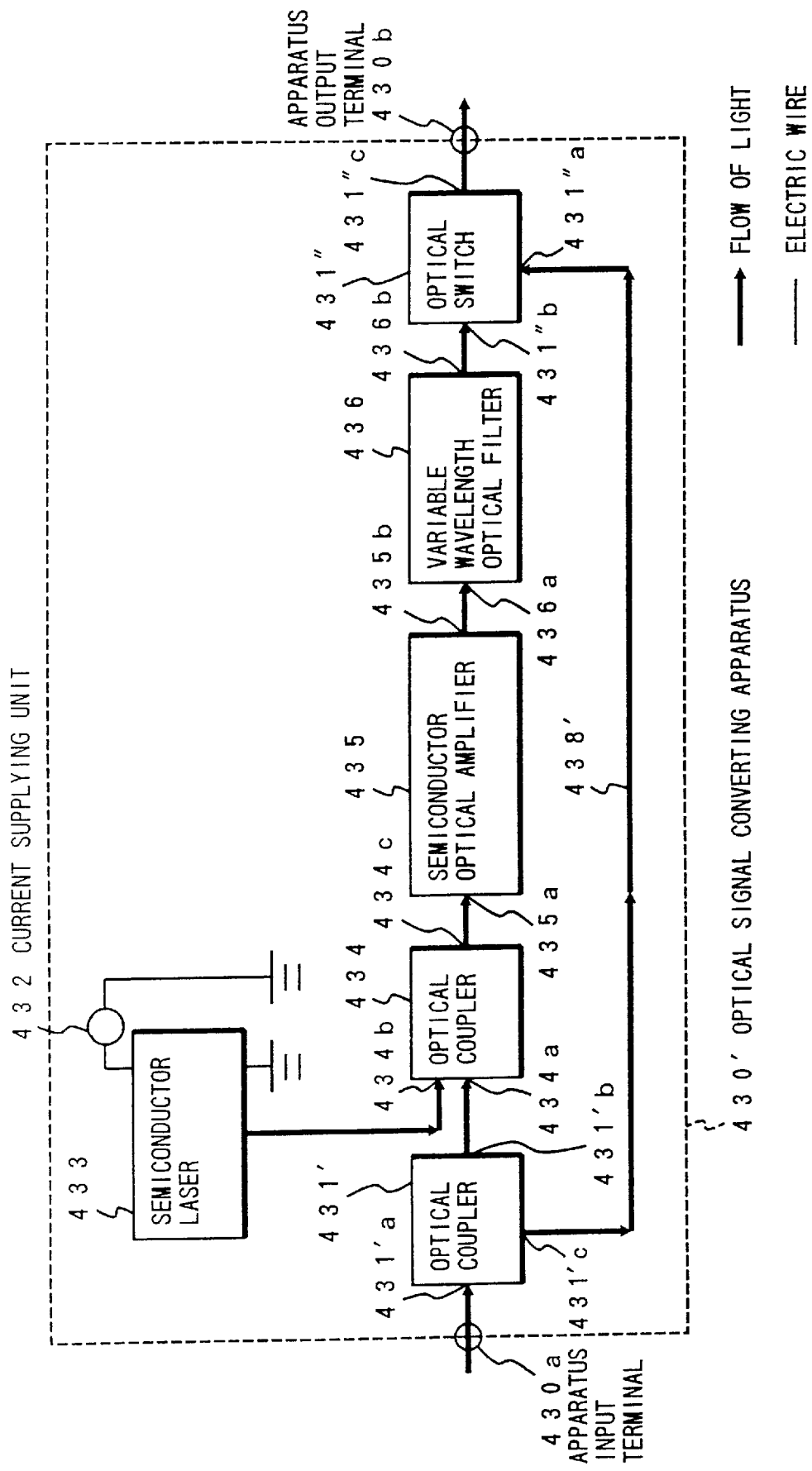
FIG. 1 is a block diagram of a conventional signal converting apparatus.

Referring to FIG. 1, a conventional optical signal converting apparatus 430' will be described at first in order to facilitate an understanding of the present invention. In FIG. 1, each of the fine or thin lines indicates an electric wire while each of the thick or bold line arrows indicates a direction of the flow of light. The optical signal converting apparatus 430' has an apparatus input terminal 430a and an apparatus output terminal 430b. The apparatus input terminal 430a is for inputting an input optical signal having an input wavelength. The apparatus output terminal 430b is for outputting an output optical signal having an output wavelength.

In the manner which will later be described, in the conventional optical signal converting apparatus 430', the input optical signal is separated into first and second separated optical signals by an optical branching unit, the first separated optical signal is supplied to an inverting wavelength converter, the second separated optical signal is supplied to a noninverting optical path, and an output of the inverting wavelength converter and another output of the noninverting optical path are switched by an optical switch to selectively produce one of those outputs.

More specifically, the illustrated optical signal converting apparatus 430' comprises a first optical coupler 431', the optical switch depicted at 431", a current supplying unit 432, a semiconductor laser 433, a second optical coupler 434, a semiconductor optical amplifier 435, and a variable wavelength optical filter 436. The semiconductor laser 433 has an oscillation wavelength while the variable wavelength optical filter 436 has a transmission wavelength. It is possible to match the transmission wavelength of the variable wavelength optical filter 436 with the oscillation wavelength of the semiconductor laser 433. The semiconductor optical amplifier 435 has a gain upon inputting a current thereto. However, a driving circuit for inputting the current to the semiconductor optical amplifier 435 is herein omitted from FIG. 1 for convenience.

The first optical coupler 431' has an input terminal 431' a connected to the apparatus input terminal 430a. The first optical coupler 431' has first and second output terminals 431'b and 431'c which are connected to a first input terminal 434a of the second optical coupler 434 and a first input terminal 431" a of the optical switch 431". The second optical coupler 434 has a second input terminal 434b connected to the semiconductor laser 433. The semiconductor laser 433 is connected to the current supplying unit 432.

The second optical coupler 434 has an output terminal which is connected to an input terminal 435a of the semiconductor optical amplifier 435. The semiconductor optical amplifier 435 has an output terminal 435b which is connected to an input terminal 436a of the variable wavelength optical filter 436. The variable wavelength optical filter 436 has an output terminal 436b which is connected to a second input terminal 431"b of the optical switch 431". The optical switch 431" has an output terminal 431"c which is connected to the apparatus output terminal 430b.

Description will be made as regards operation of the optical signal converting apparatus illustrated in FIG. 1. Supplied from the apparatus input terminal 430a, the input optical signal is optically separated or demultiplexed into the first and the second separated optical signals by the first optical coupler 431'. That is, the first optical coupler 431' serves as the optical branching unit. The first separated optical signal is supplied to the second optical coupler 434 while the second separated optical signal is supplied to the optical switch 431" via an optical path 438'. Directly supplied from the first optical coupler 431' to the optical switch 431" via the optical path, the second separated optical signal is an noninverted optical signal because the second separated optical signal has a bit logic which is coincident with that of the input optical signal. In addition, the optical path 438' is referred to as the noninverting optical path.

On the other hand, the semiconductor laser 433 oscillates a continuous oscillation optical signal having an oscillation wavelength. That is, the semiconductor laser 433 acts as an optical oscillator. The semiconductor laser 433 is supplied from the current supplying unit 432 with current. The continuous oscillation optical signal is supplied to the second input terminal 434b of the second optical coupler 434. The input wavelength of the input optical signal is different from the oscillation wavelength of the continuous oscillation optical signal. The second optical coupler 434 optically couples the first separated optical signal with the continuous oscillation optical signal to produce a coupled optical signal. The coupled optical signal is supplied from the output terminal 434c of the optical coupler 434 to the input terminal 435a of the semiconductor optical amplifier 435.

The semiconductor optical amplifier 435 optically amplifies the coupled optical signal into an amplified optical signal in the manner which will be described as the description proceeds.

That is, the semiconductor optical amplifier 435 optically amplifies the first separated optical signal having the input wavelength in the coupled optical signal as it is. The semiconductor optical amplifier 435 optically amplifies the continuous oscillation optical signal having the oscillation wavelength in the coupled optical signal with bit logic in the optical signal having the input wavelength inverted. In other words, the semiconductor optical amplifier 435 produces, as the amplified optical signal, a combination of the first separated optical signal having the input wavelength and the optical signal having the oscillation wavelength with the bit logic of the first separated optical signal is inverted. The amplified optical signal is supplied from the output terminal 435b of the semiconductor optical amplifier 453 to the input terminal 436a of the variable wavelength optical filter 436.

Inasmuch as the variable wavelength optical filter 436 has a transmission wavelength which is coincident with the oscillation wavelength of the semiconductor laser 433, the variable wavelength optical filter 436 optically filters the amplified optical signal so as to transmit, as a transmitted optical signal, an optical signal having the oscillation wavelength in the amplified optical signal.

As described above, a combination of the current supplying unit 432, the semiconductor laser 433, the second optical coupler 434, the semiconductor optical amplifier 435, and the variable wavelength optical filter 436 serves as the inverting wavelength converter for producing the inverted optical signal having the bit logic which is inverted from that of the input optical signal.

The inverted optical signal is supplied from the inverting wavelength converter to the optical switch 431". The non-inverted optical signal is also supplied from the first optical coupler 431' via the noninverting optical path 438'. The optical switch 431", optically switches between the inverted optical signal and the noninverted optical signal to select, as a selected optical signal, one of inverted optical signal and the noninverted optical signal. The optical switch produces the selected optical signal. The selected optical signal is supplied to the apparatus output terminal 430b. The apparatus output terminal 430b produces the selected optical signal as the output optical signal.

It will be assumed that the optical switch 431" is set in a state where an inverting optical path passing through the semiconductor optical amplifier 435 is selected. In this event, wavelength conversion due to mutual gain modulation occurs.

Description will be made as regards to the wavelength conversion using an effect of the mutual gain modulation in this state. In addition, it will herein be presumed as follows: When the input optical signal is present or has a mark, the input optical signal has a bit logic value of "1". When the input optical signal is absent or has a space, the input optical signal has a bit logic value of "0".

The semiconductor optical amplifier 435 is put into a saturated state by inputting the continuous oscillation optical signal having the oscillation wavelength from the semiconductor laser 433 into the semiconductor optical amplifier 435 via the second optical coupler 434. In this state, the semiconductor optical amplifier 435 is supplied via the first and the second optical couplers 431' and 434 with the input optical signal having the input wavelength that is digitally intensity modulated.

It will be assumed that the input optical signal having the mark or the logic value of "1" is supplied to the semiconductor optical amplifier 435 via the first and the second optical couplers 431' and 434. In this event, the semiconductor optical amplifier 435 has a reduced gain for the oscillation wavelength of the oscillation optical signal in the semiconductor laser 433 because of stimulated emission of the input optical signal. As a result, the semiconductor optical amplifier 435 does not produce an optical signal having a wavelength which is equal to the oscillation wavelength of the oscillation optical signal in the semiconductor laser 433. In other words, the semiconductor optical amplifier 435 produces the optical signal having the oscillation wavelength that has reduced power.

It will be presumed that the input optical signal having the space or the logic value of "0" is supplied to the semiconductor optical amplifier 435 via the first and the second optical couplers 434. Under the circumstances, the semiconductor optical amplifier 435 produces the oscillation optical signal having the oscillation wavelength supplied from the semiconductor laser 433 as it is.

Inasmuch as the variable wavelength optical filter 436 has a transmission wavelength which is coincident with the oscillation wavelength in the semiconductor laser 433, the variable wavelength optical filter 436 produces, as the transmitted optical signal, the inverted optical signal whose wavelength is converted from the input wavelength of the input optical signal to the oscillation wavelength of the continuous oscillation signal and whose bit logic is inverted from that of the input optical signal.

As described above, it is possible for the optical signal converting apparatus 430' to switch between a state where the wavelength conversion is carried out and another state where the wavelength conversion is not carried out.

Figure 2:
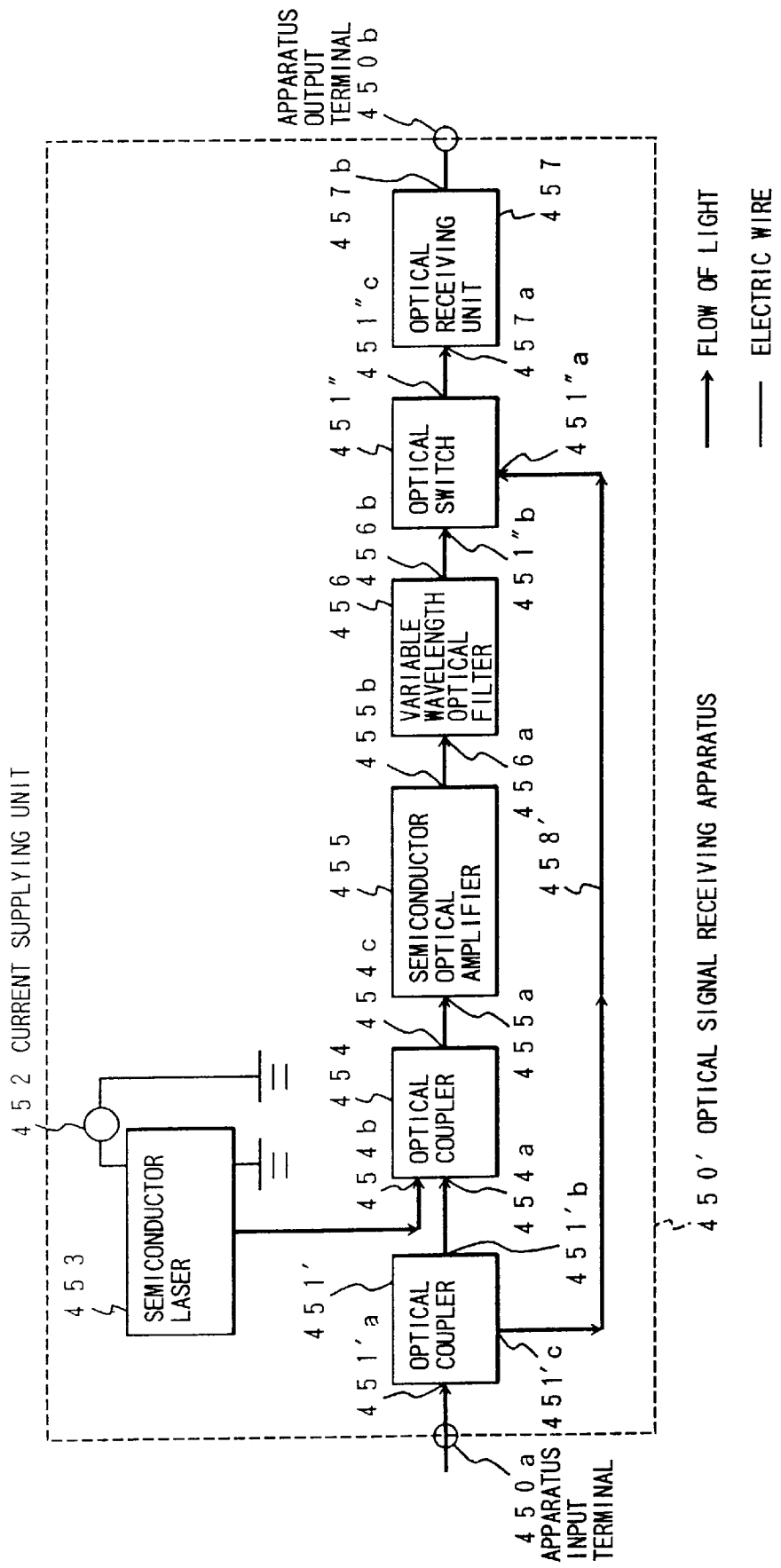
FIG. 2 is a block diagram of a conventional signal receiving apparatus.

Referring to FIG. 2, a conventional optical signal receiving apparatus 450' will be described in order to facilitate an understanding of the present invention. In FIG. 2, each of the fine or thin lines indicates an electric wire while each of the thick or bold line arrows indicates a direction of the flow of light. The optical signal receiving apparatus 450' has an apparatus input terminal 450a and an apparatus output terminal 450b. The apparatus input terminal 450s is for inputting the input optical signal having the input wavelength. The apparatus output terminal 450b is for outputting reception data RD.

The illustrated optical signal receiving apparatus 450' is similar in structure and operation to the optical signal converting apparatus 430, illustrated in FIG. 1 except that the optical receiving apparatus 450' further comprises an optical receiving unit which is depicted at 457.

That is, the optical signal receiving apparatus 450' comprises the optical receiving unit 457 as well as a first optical coupler 451', an optical switch 451", a current supplying unit 452, a semiconductor laser 453, a second optical coupler 454, a semiconductor optical amplifier 455, and a variable wavelength optical filter 456.

The first optical coupler 451' has an input terminal 451' a connected to the apparatus input terminal 450a. The first optical coupler 451' has first and second output terminals 451' b and 451'c which are connected to a first input terminal 454a of the second optical coupler 454 and a first input terminal 451", respectively a of the optical switch 451". The second optical coupler 454 has a second input terminal 454b connected to the semiconductor laser 453. The semiconductor laser 453 is connected to the current supplying unit 452.

The second optical coupler 454 has an output terminal which is connected to an input terminal 455a of the semiconductor optical amplifier 455. The semiconductor optical amplifier 455 has an output terminal 455b which is connected to an input terminal 456a of the variable wavelength optical filter 456. The variable wavelength optical filter 456 has an output terminal 456b which is connected to a second input terminal of the optical switch 451". The optical switch 451" has an output terminal 451"c which is connected to an input terminal 457a of optical receiving unit 457, which in turn has an output terminal 457b connected to the apparatus output terminal 450b.

Supplied from the optical switch 451", a selected optical signal is supplied to the optical receiving unit 457. The optical receiving unit 457 converts the selected optical signal into a selected electrical signal. The selected electrical signal is supplied to the apparatus output terminal 450b. The apparatus output terminal 450b produces the selected electrical signal as the reception data RD.

With this structure, it is possible to always receive the input optical signal in the optical receiving unit 457 with a normal bit logic by switching the optical switch 451" between a noninverting optical path 458' and an inverting optical path which includes the semiconductor optical amplifier 455. This is because the optical switch 451" is switched so as to select the inverting optical path including the semiconductor optical amplifier 455 when the inverted optical signal is supplied to the optical signal receiving apparatus 450' as the input optical signal. In addition, the optical switch 451" is switched so as to select the noninverting optical path 458' when the noninverted optical signal is supplied to the optical signal receiving apparatus 450' as the input optical signal.

As described above, it is possible for the conventional optical signal receiving apparatus 450' illustrated in FIG. 2 to receive the input optical signal with the normal bit logic by switching the optical switch 451" although the optical signal receiving apparatus 450' is supplied with, as the input optical signal, either the inverted optical signal or the noninverted optical signal.

However, the conventional optical signal receiving apparatus 450' is disadvantageous in that it has a larger optical loss. This is because the input optical signal passes through the first optical coupler (the optical branching unit) 451' and the optical switch 451". Accordingly, the optical receiving unit 457 is supplied with the selected optical signal having a small optical power and it results in requiring the optical receiving unit 457, to have high sensitivity which increases the cost of the product, as mentioned in the the preamble of the instant specification. In addition, the conventional optical signal receiving apparatus 450' is disadvantageous in that it requires a larger mounted space and it results in increasing cost of product, as mentioned also in the preamble of the instant specification.

Similarly, the conventional optical signal converting apparatus 430' is disadvantageous in that it results in requiring a larger mounted space and in increasing cost of product, as mentioned in the preamble of the instant specification. This is because the conventional optical signal converting apparatus 430' must be equipped with the optical branching unit 431' and the optical switch 431".

Figure 3:
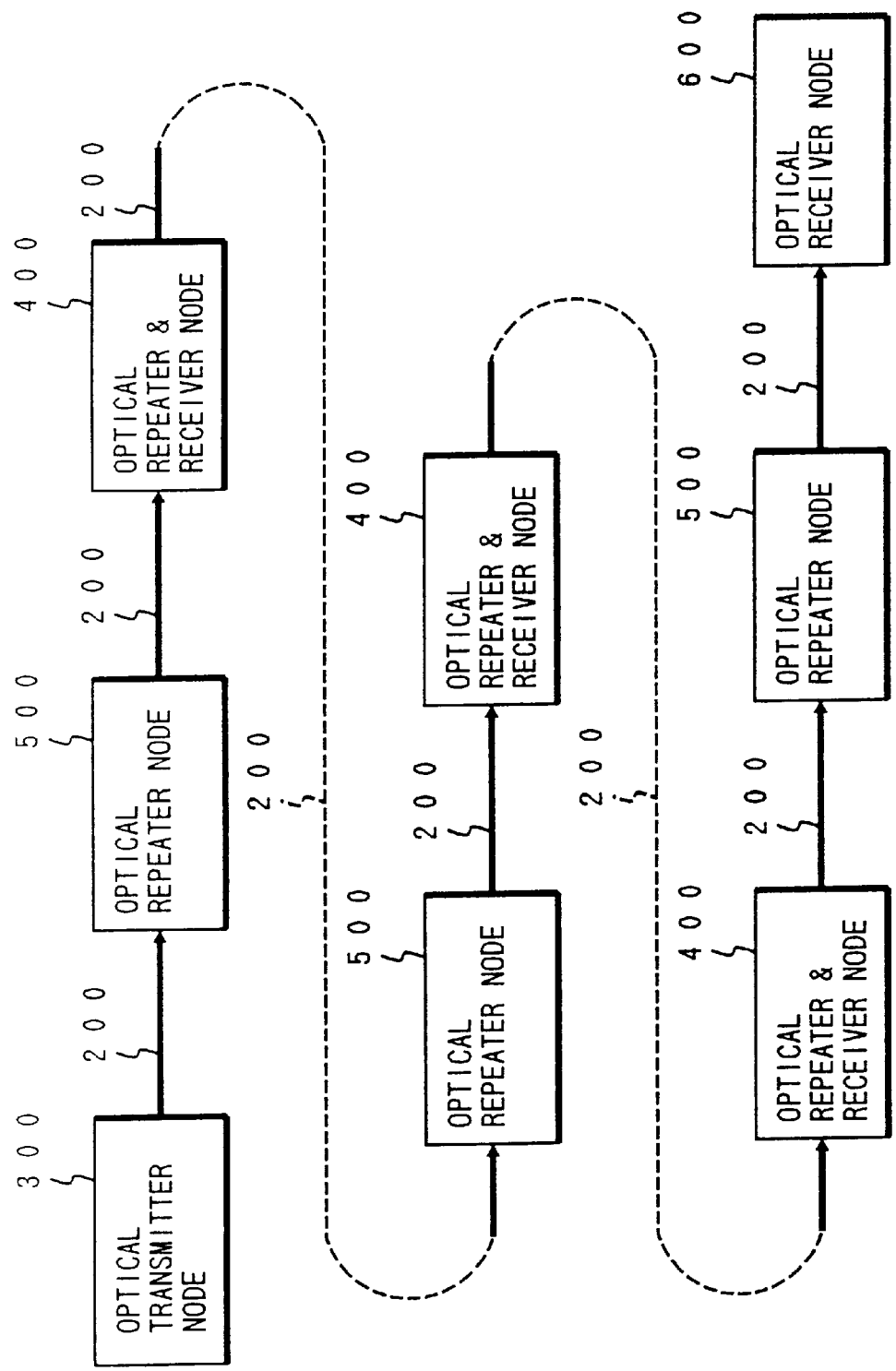
FIG. 3 is a block diagram of an optical communication network system to which this invention is applicable.

Referring to FIG. 3, the description will proceed to an optical communication network system to which this invention is applicable. The optical communication network system comprises a plurality of optical communication network nodes in the manner which will presently become clear. As shown in FIG. 3, the optical communication network nodes are connected via a plurality of optical transmission paths 200 to each other in a cascade connection fashion. Each optical transmission path 200 may be an optical fiber. The optical communication network nodes are classified as an optical transmitter node 300, an optical repeater and receiver node 400, an optical repeater node 500, and an optical receiver node 600.

In the optical communication network system, a main optical signal carrying data to be transmitted may be either an inverted optical signal or a noninverted optical signal, as mentioned in the preamble of the instant specification. Accordingly, it is necessary for each optical communication network node to understand whether the main optical signal is an inverted optical signal or a noninverted optical signal. In the example being illustrated, in order to make each optical communication network node understand whether the main optical signal is an inverted optical signal or a noninverted signal, the following means is used.

More specifically, as means for transmitting information related to monitoring and controlling the main optical signal, a particular optical signal is used. The particular optical signal has a particular wavelength which is different from that of the main optical signal. The particular optical signal for the monitoring and controlling of the main optical signal herein called a "monitor and control optical signal." The monitor and control optical signal carries information indicative of whether or not bit logic of the main optical signal is inverted and is transferred to each optical communication network node. Although the monitor and control optical signal is finally converted into a monitor and control electrical signal in each optical communication network node, it is possible for each optical communication network node to determine whether or not inversion of the main optical signal should be carried out on the basis of the monitor and control electrical signal.

In the manner which will later become clear, a multiplexed optical signal is transmitted from the optical transmitter node 300 to the optical receiver node 600 via the optical transmission paths 200, the optical repeater and receiver nodes 400 and the optical repeater nodes 500. The multiplexed optical signal is an optical signal where the main optical signal and the monitor and control optical signal are optically multiplexed in the manner which will be described as the description proceeds. The main optical signal and the monitor and control optical signal have wavelengths which are different from each other.

The optical transmitter node 300 carries out a transmission operation on the multiplexed optical signal in the manner which will later become clear. The optical repeater and receiver node 400 carries out a repeating and reception operation on the multiplexed optical signal in the manner which will later become clear. The optical repeater node 500 carries out only a repeating operation on the multiplexed optical signal in the manner which will later become clear. The optical receiver node 600 carries out only a reception operation on the multiplexed optical signal in the manner which will later become clear.

Figure 4:
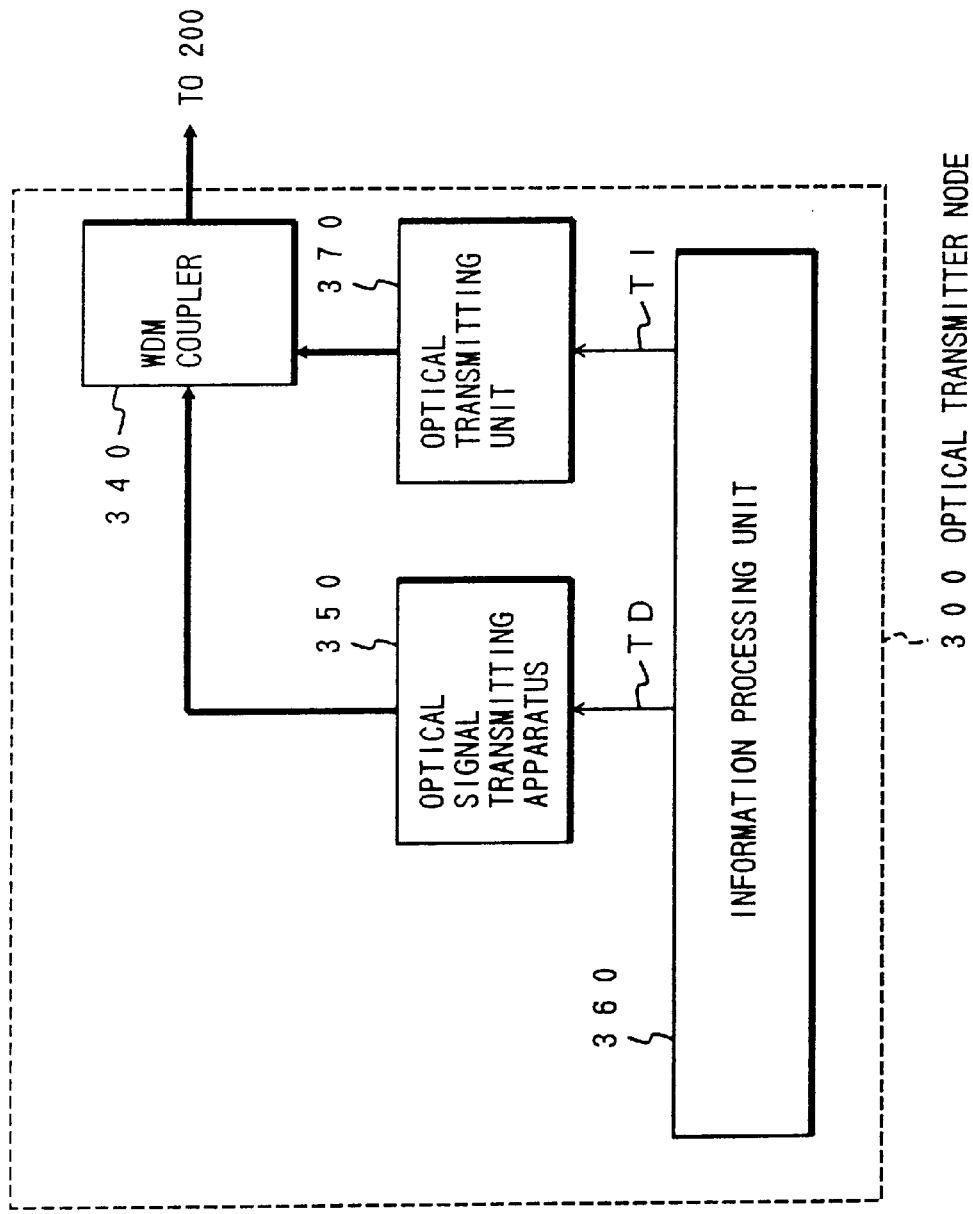
FIG. 4 is a block diagram of an optical transmitter node for use in the optical communication network system illustrated in FIG. 3.

Turning to FIG. 4, description will proceed to the optical transmitter node 300 illustrated in FIG. 3. In FIG. 4, each of the fine or thin lines indicates an electric wire while each of the thick or bold line arrows indicates a direction of the flow of light. The optical transmitter node 300 comprises a wavelength division multiplex (WDM) coupler 340, an optical signal transmitting apparatus 350, an information processing unit 360, and an optical transmitting unit 370. The information processing unit 360 may be a personal computer, a work station, or the like.

The information processing unit 360 supplies the optical signal transmitting apparatus 350 and the optical transmitting unit 370 with a main electrical signal or transmission data TD and a monitor and control electrical signal or transmission information TI, respectively. The main electrical signal or the transmission data TD includes data to be transmitted. The monitor and control electrical signal or the transmission information TI indicates information related to monitoring and controlling the main electrical signal.

Responsive to the main electrical signal or the transmission data TD, the optical signal transmitting apparatus 350 converts the main electrical signal TD into the main optical signal to transmit the main optical signal in the manner known in the art. Responsive to the monitor and control electrical signal or the transmission information TI, the optical transmitting unit 370 converts the monitor and control electrical signal TI into the monitor and control optical signal to transmit the monitor and control optical signal.

The main optical signal and the monitor and control optical signal are supplied to the WDM coupler 340. The WDM coupler 340 optically couples the main optical signal and the monitor and control optical signal to produce a coupled optical signal as the multiplexed optical signal. That is, the WDM coupler 340 serves as an optical multiplexer for optically multiplexing the main optical signal and the monitor and control optical signal into the multiplexed optical signal.

The multiplexed optical signal is transmitted from the optical transmitter node 300 to the optical repeater and receiver node 400 via the optical transmission paths 200 and the optical repeater node 500.

Figure 5:
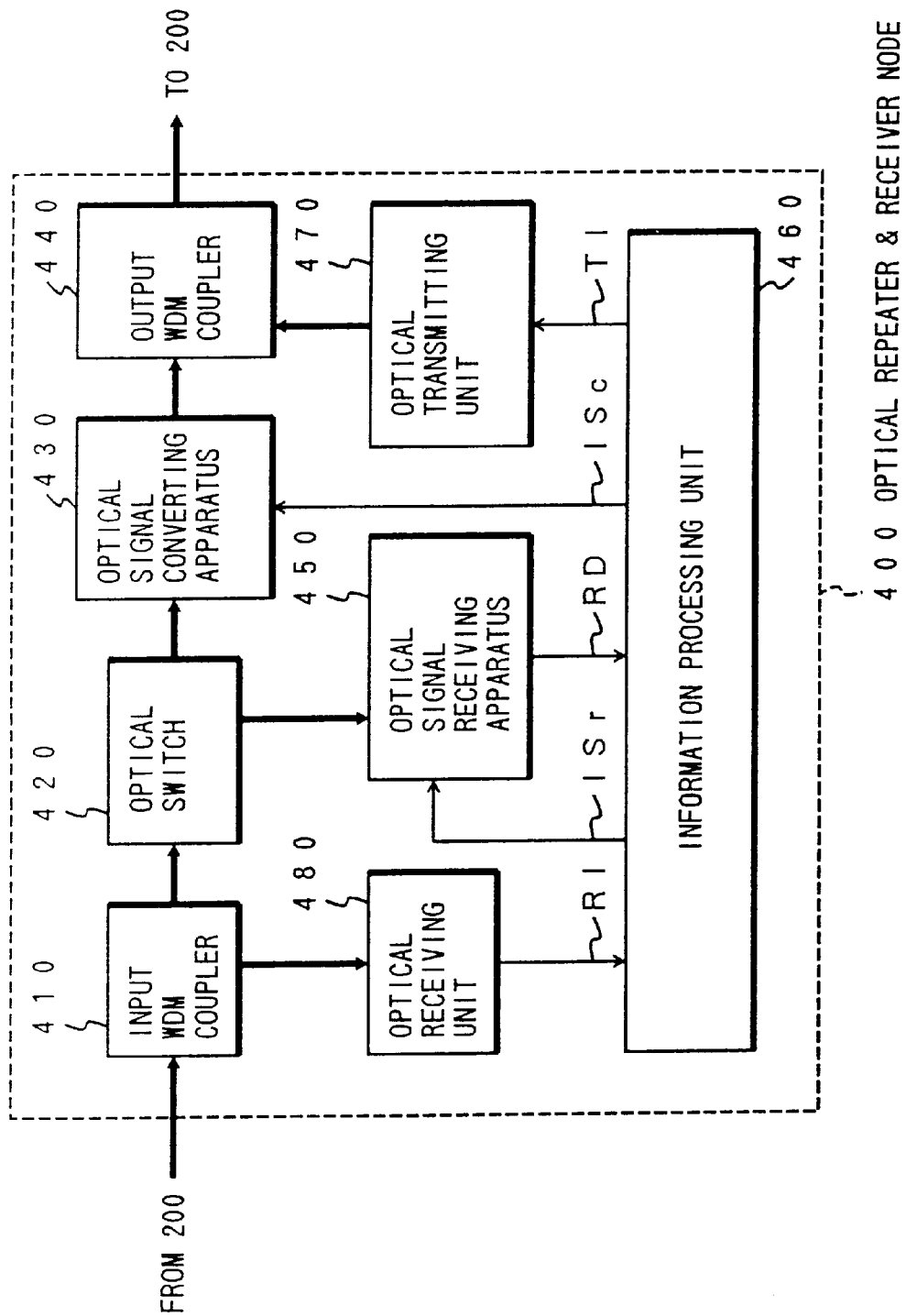
FIG. 5 is a block diagram of an optical repeater and receiver node according to a first embodiment of this invention for use in the optical communication network system illustrated in FIG. 3.

Turning to FIG. 5, the description will proceed to the optical repeater and receiver node 400 illustrated in FIG. 3. In FIG. 5, the each of fine or thin lines indicates an electric wire while each of the thick or bold line arrows indicates a direction of the flow of light. The optical repeater and receiver node 400 comprises an input WDM coupler 410, an optical switch 420, an optical signal converting apparatus 430, an output WDM coupler 440, an optical signal receiving apparatus 450, an information processing unit 460, an optical transmitting unit 470, and an optical receiving unit 480.

The optical switch 420 maybe a mechanical optical switch, an optical switch utilizing electrooptic effect such as Kerr effect or Pockels effect, an optical switch utilizing acoustooptic effect, or the like. The information processing unit 460 may be a personal computer, a work station, or the like.

The input WDM coupler 410 is supplied with the multiplexed optical signal from the optical transmission path 200. The input WDM coupler 410 optically demultiplexes or separates the multiplexed optical signal into the main optical signal and the monitor and control optical signal. That is, the input WDM coupler 410 acts as an optical demultiplexer or an optical separator for demultiplexing or separating the multiplexed optical signal into the main optical signal and the monitor and control optical signal. The main optical signal is supplied to the optical switch 420 while the monitor and control optical signal is supplied to the optical receiving unit 480.

The optical receiving unit 480 converts the monitor and control optical signal into a monitor and control electrical signal which is supplied to the information processing unit 460 as reception information RI. That is, the optical receiving unit 480 is operable in cooperation with the input WDM coupler 410 as an information receiving arrangement for receiving the reception information RI related to monitoring and controlling for the main optical signal.

On the other hand, the optical switch 420 carries a switching operation on the main optical signal to send the main optical signal to either the optical signal converting apparatus 430 or the optical signal receiving apparatus 450. The optical signal converting apparatus 430 and the optical signal receiving apparatus 450 are supplied from the information processing unit 460 with a conversion instruction signal ISc and a reception instruction signal ISr, respectively, which will become clear as the description proceeds.

It will be assumed that the optical signal converting apparatus 430 is supplied with the main optical signal from the optical switch 420 as an input optical signal having an input wavelength. In this event, the optical signal converting apparatus 430 converts, in response to the conversion instruction signal ISc, the input optical signal into an output optical signal having an output wavelength in the manner which will later become clear. The output optical signal is supplied from the optical signal converting apparatus 430 to the output WNM coupler 440 as a refreshed main optical signal.

It will be presumed that the optical signal receiving apparatus 450 is supplied with the main optical signal from the optical switch 420 as the input optical signal. Under the circumstances, the optical signal receiving apparatus 450 receives the main optical signal in response to the reception instruction signal ISr to produce a main electrical signal or reception data RD, in the manner which will later become clear. The main electrical signal or the reception data RD is supplied to the information processing unit 460.

The information processing unit 460 carries out a processing operation on the reception information RI to produce the conversion instruction signal ISc and the reception instruction signal ISr both of which indicate inverting/noninverting of bit logic for the main optical signal. The information processing unit 460 supplies the optical transmitting unit 470 with the transmission information TI related to monitoring and controlling the main optical signal as a monitor and control electrical signal.

The optical transmitting unit 470 converts the monitor and control electrical signal TI into a monitor and control optical signal to transmit the monitor and control optical signal in the manner known in the art. The monitor and control optical signal is supplied from the optical transmitting unit 470 to the output WDM coupler 440. The output WDM coupler 440 is also supplied with the main optical signal from the optical signal converting apparatus 430. The output WDM coupler 440 optically multiplexes the main optical signal and the monitor and control optical signal into a refreshed multiplexed optical signal. The refreshed multiplexed optical signal is transmitted from the optical repeater and receiver node 400 via the optical transmission path 200 to an adjacent optical communication network node which is adjacent to the optical repeater and receiver node 400 in question.

At any rate, the optical transmitting unit 470 is operable in cooperation with the output WDM coupler 440 as an information transmitting arrangement for transmitting the transmission information TI related to monitoring and controlling for the main optical signal.

Figure 6:
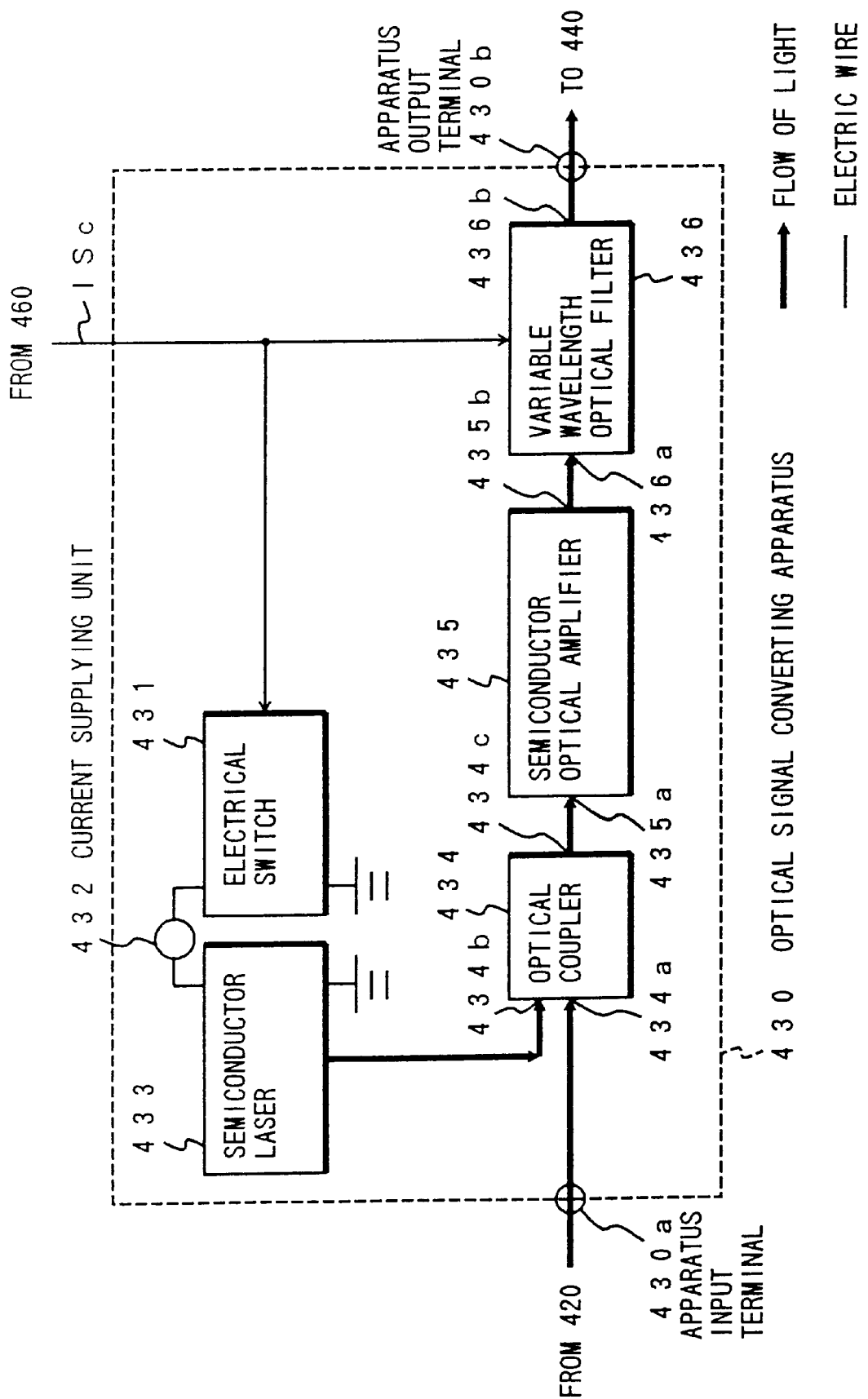
FIG. 6 is a block diagram of an optical signal converting apparatus for use in the optical repeater and receiver node illustrated in FIG. 5.

Turning to FIG. 6, the description will proceed to the optical signal converting apparatus 430 illustrated in FIG. 5. In FIG. 6, each of the fine or thin lines indicates an electric wire while each of the thick or bold line arrows indicates a direction of the flow of light. The optical signal converting apparatus 430 has an apparatus input terminal 430a and an apparatus output terminal 430b. The apparatus input terminal 430a is for inputting the input optical signal having the input wavelength from the optical switch 420 (FIG. 5). The apparatus output terminal 430b is for outputting the output optical signal having the output wavelength to the output WDM coupler 440 (FIG. 5).

The illustrated optical signal converting apparatus 430 comprises an electrical switch 431, a current supplying unit 432, a semiconductor laser 433, an optical coupler 434, a semiconductor optical amplifier 435, and a variable wavelength optical filter 436. The optical coupler 434 has an input terminal 434a connected to the apparatus input terminal 430a and another input terminal 434b connected to the semiconductor laser 433. The semiconductor laser 433 is connected to a series circuit which comprises the current supplying unit 432 and the electrical switch 431. The optical coupler 434 has an output terminal 434c which is connected to an input terminal 435a of the semiconductor optical amplifier 435. The semiconductor optical amplifier 435 has an output terminal 435b which is connected to an input terminal 436a of the variable wavelength optical filter 436. The variable wavelength optical filter 436 has an output terminal 436b which is connected to the apparatus output terminal 430b.

Although the structure of the current supplying unit 432 is not illustrated in FIG. 6, the current supplying unit 432 may comprise a current source and a driving circuit for driving the semiconductor laser 433. Alternatively, the current supplying unit 432 may comprise a voltage source and the driving circuit for driving the semiconductor laser 433.

The electrical switch 431 is supplied with the conversion instruction signal ISc from the information processing unit 460 (FIG. 5). In response to the conversion instruction signal ISc, the electrical switch 431 is turned on or off. More specifically, the electrical switch 431 is turned on when the conversion instruction signal ISc indicates the inverting of bit logic for the main optical signal. The electrical switch 431 is turned off when the conversion instruction signal ISc indicates the noninverting of the bit logic for the main optical signal. In addition, the electrical switch 431 makes the current supplying unit 432 supply a current to the semiconductor laser 433 when the electrical switch 431 is turned on. On the other hand, the electrical switch 431 stops the current supplying unit 432 from supplying current to the semiconductor laser 433 when the switch 431 is turned off.

The electrical switch 431 may be implemented by a switch using an electromagnet such as an electromagnetic relay, an analog switch of semiconductor, or the like. In addition, the electrical switch 431 may change a resistance value of a resistor in the driving circuit of the current supplying unit 432 to control the current supplying unit 432 so as to supply or to stop the current from the current supplying unit 432.

When the semiconductor laser 433 is supplied from the current supplying unit 432 with the current, the semiconductor laser 433 is put into an active state for oscillating an oscillation optical signal having an oscillation wavelength. The oscillation wavelength may be equal to the input wavelength of the input optical signal or may be different from the input wavelength of the input optical signal. That is, the semiconductor laser 433 serves as an optical oscillator for the oscillating the oscillation optical signal having the oscillation wavelength. When the semiconductor laser 433 is not supplied from the current supplying unit 432 with the current, the semiconductor laser is put into an inactive state to stop the oscillating of the oscillation optical signal.

At any rate, the electrical switch 431 acts in cooperation with the current supplying unit 432 as a mode setting arrangement for setting, in response to the conversion instruction signal ISc, a mode for the semiconductor laser 433 in one of an active mode for making the semiconductor laser 433 supply the oscillation optical signal as an output and an inactive mode for stopping the semiconductor laser 433 from supplying the oscillation optical signal. In particular, the mode setting arrangement sets the mode for the semiconductor laser 433 in the inactive mode when the conversion instruction signal ISc indicates the noninverting of the bit logic for the main optical signal. The mode setting arrangement sets the mode for the semiconductor laser 433 in the active mode when the conversion instruction signal ISc indicates the inverting of the bit logic for the main optical signal.

The oscillation optical signal is supplied to the input terminal 434b of the optical coupler 434 from the semiconductor laser 433. The input terminal 434a of the optical coupler 434 is supplied with the input optical signal from the apparatus input terminal 430a. The optical coupler434 optically couples the input optical signal and the oscillation optical signal to produce a coupled optical signal. The coupled optical signal is supplied from the output terminal 434c of the optical coupler 434 to the input terminal 435a of the semiconductor optical amplifier 435.

The semiconductor optical amplifier 435 produces a gain upon inputting a current thereto. However, a driving circuit for inputting the current to the semiconductor optical amplifier 435 is herein omitted from FIG. 6. The semiconductor optical amplifier 435 optically amplifies the coupled optical signal into an amplified optical signal in the manner which will be described as the description proceeds. Although a detailed description of the semiconductor optical amplifier 435 will later be made, a brief description of the semiconductor optical amplifier 435 will presently be made.

That is, the semiconductor optical amplifier 435 optically amplifies an optical signal having the input wavelength in the coupled optical signal as is. The semiconductor optical amplifier 435 optically amplifies an optical signal having the oscillation wavelength in the coupled optical signal with bit logic in the optical signal having the input wavelength inverted. The amplified optical signal is supplied from the output terminal 435b of the semiconductor optical amplifier 453 to the input terminal 436a of the variable wavelength optical filter 436.

The variable wavelength optical filter 436 is set with a transmission wavelength. The variable wavelength optical filter 436 may be implemented by an interference film filter. Under the circumstances, the variable wavelength optical filter 436 can vary the transmission wavelength by changing an incident angle of the amplified optical signal for the interference film filter. In the example being illustrated, the variable wavelength optical filter 436 varies the transmission wavelength to one of the input wavelength of the input optical signal and the oscillation wavelength of the semiconductor laser 433. The variable wavelength optical filter 436 optically filters the amplified optical signal so as to transmit, as a transmitted optical signal, an optical signal having the transmission wavelength in the amplified optical signal.

The variable wavelength optical filter 436 is supplied with the conversion instruction signal ISc from the information processing unit 460 (FIG. 5). The variable wavelength optical filter 436 uses the input wavelength as the transmission wavelength when the conversion instruction signal ISc indicates the noninverting of the bit logic for the main optical signal. On the other hand, the variable wavelength optical filter 436 uses the oscillation wavelength as the transmission wavelength when the conversion instruction signal ISc indicates the inverting of the bit logic for the main optical signal.

The transmitted optical signal is supplied from the output terminal 436b of the variable wavelength optical filter 436 to the apparatus output terminal 430b. The apparatus output terminal 430b produces the transmitted optical signal as the output optical signal. That is, the apparatus output terminal 430a serves as an arrangement for producing the transmitted optical signal as the output optical signal. The output optical signal is supplied to the output WDM coupler 440 (FIG. 5) as the refreshed main optical signal.

Initialization for the optical signal converting apparatus 430 is carried out as follows. The apparatus input terminal 430a is initially supplied with no optical signal. The electrical switch 431 is then turned on. Upon this event, the semiconductor optical amplifier 435 is put into a saturated state of the gain. For this purpose, a driving current for the semiconductor optical amplifier 435 and a current supply for the semiconductor laser 433 are preliminarily controlled.

With this structure, it is possible to selectively produce, as the output optical signal, an optical signal where the bit logic of the input optical signal is inverted and another optical signal where the bit logic of the input optical signal is not inverted.

More specifically, it will be assumed that it is desired to obtain, as the output optical signal, the optical signal where the bit logic of the input optical signal is inverted. In this event, the information processing unit 460 (FIG. 5) supplies the optical signal converting apparatus 430 with the conversion instruction signal ISc indicative of the inverting of the bit logic for the input optical signal or the main optical signal. Responsive to the conversion instruction signal ISc, the electrical switch 431 is turned on to put the semiconductor laser 433 into an oscillating state. Responsive to the conversion instruction signal ISc, the variable wavelength optical filter 436 is set with the oscillation wavelength of the semiconductor laser 433 as the transmission wavelength. As a result, it is possible to make the apparatus output terminal 430a produce, as the output optical signal, the optical signal where the bit logic of the input optical signal is inverted.

On the other hand, it will be presumed that it is desired to obtain, as the output optical signal, the optical signal where the bit logic of the input optical signal is not inverted. In this event, the information processing unit 460 (FIG. 5) supplies the optical signal converting apparatus 430 with the conversion instruction signal ISc indicative of the noninverting of the bit logic for the input optical signal or the main optical signal. Responsive to the conversion instruction signal ISc, the electrical switch 431 is turned off to put the semiconductor laser 433 into an unoscillating state. Accordingly, mutual gain modulation does not occur in the semiconductor optical amplifier 435. In addition, responsive to the conversion instruction signal ISc, the variable wavelength optical filter 436 is set with the input wavelength of the input optical signal as the transmission wavelength. As a result, it is possible to make the apparatus output terminal 430a produce, as the output optical signal, the optical signal where the bit logic of the input optical signal is not inverted.

It is possible to match the transmission wavelength of a variable wavelength optical filter for use in a normal wavelength converter with the oscillation wavelength of a continuous oscillation optical signal in the semiconductor laser 433 or the like alone. On the other hand, it is possible for the optical signal converting apparatus 430 illustrated in FIG. 6 to match the transmission wavelength of the variable wavelength optical filter 436 with either the oscillation wavelength of the semiconductor laser 433 or the input wavelength of the input optical signal. As a result, it is possible to carry out the switching operation of the inverting/ noninverting of the bit logic for the input optical signal.

The optical signal converting apparatus 430 has various effects in comparison with the conventional optical converting apparatus illustrated in FIG. 1 as follows. That is, it is unnecessary for the optical signal converting apparatus 430 to provide the optical branching unit 431', the optical switch 431", and so on which are required in the conventional optical converting apparatus. As a result, it is possible to decrease optical loss. Accordingly, the output optical signal produced by the optical signal converting apparatus 430 has a larger optical power than that produced by the conventional signal converting apparatus 430' illustrated in FIG. 1. In addition, inasmuch as there is no need to provide the optical branching unit 431' and the optical switch 431", the optical signal converting apparatus 430 is advantageous in that it is possible to reduce packaging volume. Furthermore, inasmuch as a combination of the optical switch 431" and the optical branching unit 431' are more expensive than the electrical switch 431, the optical signal converting apparatus 430 is a lower cost than that of the conventional signal converting apparatus 430' by the differential in those parts. Inasmuch as noises in an optical signal is cut off by the variable wavelength optical filter 436 in the optical signal converting apparatus 430, it is unnecessary to provide an optical filter function for cutting noises required in the whole system. Alternatively, such an optical filter function is reduced and is low in cost.

In addition, it is possible not only to switch between the inverting and the noninverting of the bit logic for the output optical signal by using the electrical switch 431 but also to switching between conversion of the input wavelength of the input optical signal and nonconversion of the input wavelength of the input optical signal.

More specifically, it will be assumed that it is desired to convert the input wavelength of the input optical signal into the oscillation wavelength of the semiconductor laser 433. In this event, the information processing unit 460 (FIG. 5) supplies the optical signal converting apparatus 430 with the conversion instruction signal ISc indicative of the inverting of the bit logic for the input optical signal or the main optical signal. Responsive to the conversion instruction signal ISc, the electrical switch 431 is turned on to put the semiconductor laser 433 into an oscillating state. As a result, the semiconductor optical amplifier 435 is supplied with the coupled optical signal into which the input optical signal and the oscillation optical signal are coupled and in which the mutual gain modulation occurs. In addition, responsive to the conversion instruction signal ISc, the variable wavelength optical filter 436 is set with the oscillation wavelength of the semiconductor laser 433 as the transmission wavelength. As a result, it is possible to convert the input wavelength of the input optical signal into the oscillation wavelength in the semiconductor laser 433.

On the other hand, it will be presumed that it is desired to produce the output optical signal without conversion of the input wavelength of the input optical signal. In this event, the information processing unit 460 (FIG. 5) supplies the optical signal converting apparatus 430 with the conversion instruction signal ISc indicative of the noninverting of the bit logic for the input optical signal or the main optical signal. Responsive to the conversion instruction signal ISc, the electrical switch 431 is turned off to put the semiconductor laser 433 into an unoscillating state. Accordingly, the mutual gain modulation does not occur in the semiconductor optical amplifier 435. In addition, responsive to the conversion instruction signal ISc, the variable wavelength optical filter 436 is set with the input wavelength of the input optical signal as the transmission wavelength. As a result, it is possible to make the apparatus output terminal 430b produce, as the output optical signal, the optical signal into which the input optical signal is optically amplified by the semiconductor optical amplifier 435. The output optical signal is one where the input wavelength of the input optical signal is not converted.

As described above, it is possible to switch between a mode for carrying out wavelength conversion and another mode for carrying out no wavelength conversion by turning the electrical switch on or off.

In addition, in the wavelength converting unit using the mutual gain modulation in the semiconductor optical amplifier 435 like in FIG. 1, it is impossible to separate the input optical signal from the continuous oscillation optical signal by using the optical filter (the variable wavelength optical filter) in a case where the conventional optical signal converting apparatus 430' is supplied with the input optical signal having the input wavelength which is coincident with the oscillation wavelength of the continuous oscillation optical signal. This is because the input wavelength of the input optical signal and the oscillation wavelength of the continuous oscillation optical signal are equal to each other.

On the other hand, it is possible for the optical signal converting apparatus to supply the amplifier with the input optical signal having the input wavelength equal to the oscillation wavelength in the semiconductor laser 433 by putting the semiconductor laser 433 into an off state.

Figure 7:
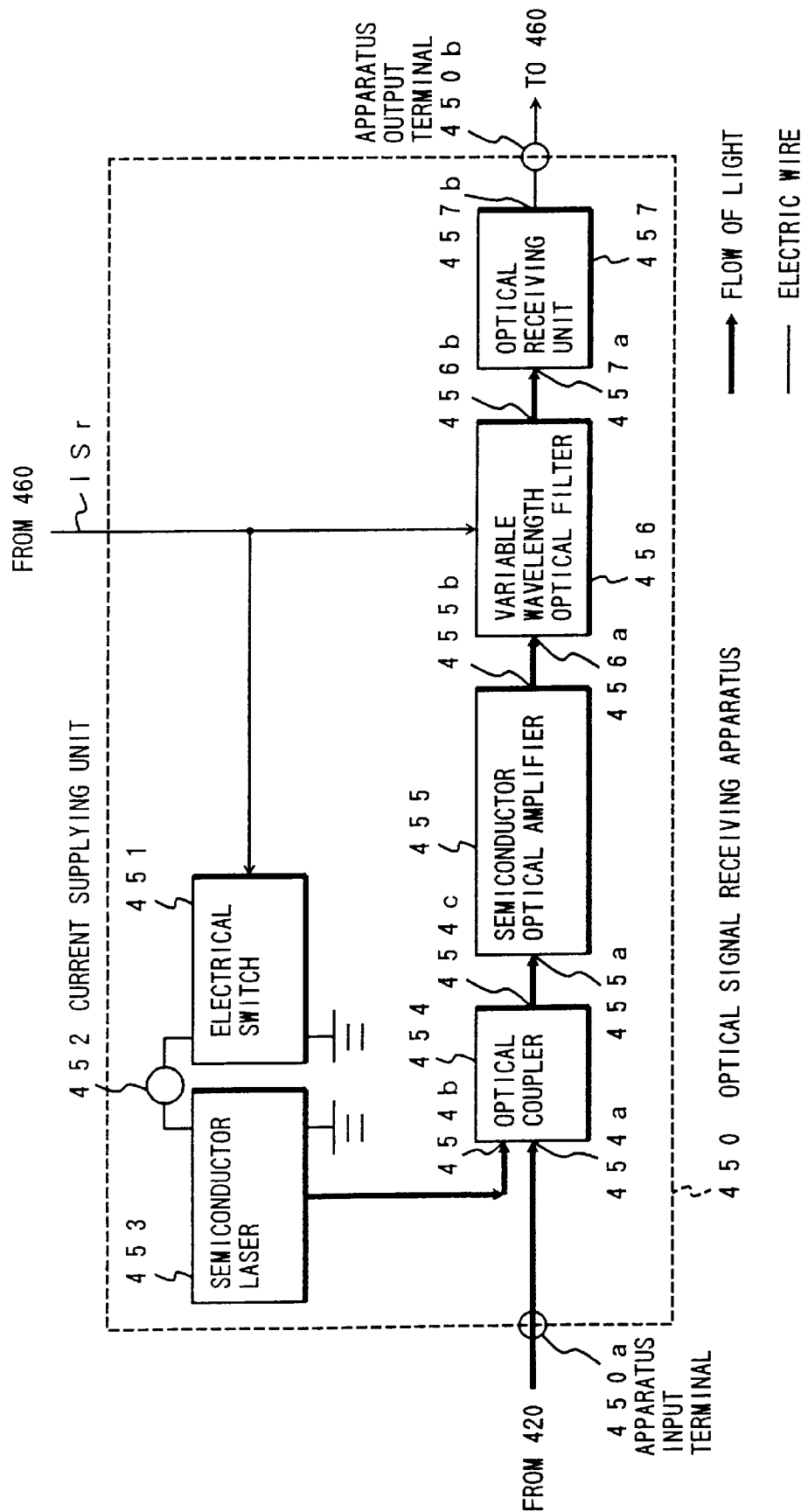
FIG. 7 is a block diagram of an optical signal receiving apparatus for use in the optical repeater and receiver node illustrated in FIG. 5.

Turning to FIG. 7, description will proceed to the optical signal receiving apparatus 450 illustrated in FIG. 5. In FIG. 7, each the fine or thin lines indicates an electric wire while each the thick or bold line arrows indicates a direction of the flow of light. The optical signal receiving apparatus 450 has an apparatus input terminal 450a and an apparatus output terminal 450b. The apparatus input terminal 450a is for inputting the input optical signal having the input wavelength from the optical switch 420 (FIG. 5). The apparatus output terminal 430b is for outputting the reception data RD to the information processing unit 460 (FIG. 5).

The illustrated optical signal receiving apparatus 450 is similar in structure and operation to the optical signal converting apparatus 430 illustrated in FIG. 6 except that the optical receiving apparatus 450 further comprises an optical receiving unit which is depicted at 457.

That is, the optical signal receiving apparatus 450 comprises the optical receiving unit 457 as well as an electrical switch 451, a current supplying unit 452, a semiconductor laser 453, an optical coupler 454, a semiconductor optical amplifier 455, and a variable wavelength optical filter 456. The optical coupler 454 has an input terminal 454a connected to the apparatus input terminal 450a and another input terminal 454b connected to the semiconductor laser 453. The semiconductor laser 453 is connected to the current supplying unit 452 and the electrical switch 451 in series. The optical coupler 454 has an output terminal which is connected to an input terminal 455a of the semiconductor optical amplifier 455. The semiconductor optical amplifier 455 has an output terminal 455b which is connected to an input terminal 456a of the variable wavelength optical filter 456. The variable wavelength optical filter 456 has an output terminal 456b which is connected to an input terminal 457a of the optical receiving unit 457. The optical receiving unit 457 has an output terminal 457b which is connected to the apparatus output terminal 450b.

Although structure of the current supplying unit 452 is not illustrated in FIG. 7, the current supplying unit 452 may comprise a current source and a driving circuit for driving the semiconductor laser 453. Alternatively, the current supplying unit 452 may comprise a voltage source and the driving circuit for driving the semiconductor laser 453.

The electrical switch 451 is supplied with the reception instruction signal ISr from the information processing unit 460 (FIG. 5). Response to the reception instruction signal ISr, the electrical switch 451 is turned on or off. More specifically, the electrical switch 451 is turned on when the reception instruction signal ISr indicates the inverting of bit logic for the main optical signal. The electrical switch 451 is turned off when the reception instruction signal ISr indicates the noninverting of the bit logic for the main optical signal. In addition, the electrical switch 451 makes the current supplying unit 452 supply a current to the semiconductor laser 453 when the electrical switch 451 is turned on. On the other hand, the electrical switch 451 stops the current supplying unit 452 from supplying the current to the semiconductor laser 453.

The electrical switch 451 may be implemented by a switch using an electromagnet such as an electromagnetic relay, an analog switch of semiconductor, or the like. In addition, the electrical switch 451 may change a resistance value of a resistor in the driving circuit of the current supplying unit 452 to control the current supplying unit 452 so as to supply or to stop the current from the current supplying unit 452.

When the semiconductor laser 453 is supplied from the current supplying unit 452 with the current, the semiconductor laser 453 is put into an active state to oscillate an oscillation optical signal having an oscillation wavelength. The oscillation wavelength may be equal to the input wavelength of the input optical signal or may be different from the input wavelength of the input optical signal. That is, the semiconductor laser 453 serves as an optical oscillator for oscillating the oscillation optical signal having the oscillation wavelength. When the semiconductor laser 453 is not supplied from the current supplying unit 452 with the current, the semiconductor laser 453 is put into an inactive state to stop the oscillating of the oscillation optical signal.

At any rate, the electrical switch 451 acts in cooperation with the current supplying unit 452 as a mode setting arrangement for setting, in response to the reception instruction signal ISr, a mode for the semiconductor laser 453 in one of an active mode for making the semiconductor laser 453 supply the oscillation optical signal to an output and an inactive mode for stopping the semiconductor laser 453 from supplying the oscillation optical signal as an output. In particular, the mode setting arrangement sets the mode for the semiconductor laser 453 in the inactive mode when the reception instruction signal ISr indicates the noninverting of the bit logic for the main optical signal. The mode setting arrangement sets the mode for the semiconductor laser 453 in the active mode when the reception instruction signal ISc indicates the inverting of the bit logic for the main optical signal.

The oscillation optical signal is supplied to the input terminal 454b of the optical coupler 454 from the semiconductor laser 453. The input terminal 454a of the optical coupler 454 is supplied with the input optical signal from the apparatus input terminal 450a. The optical coupler 454 optically couples the input optical signal and the oscillation optical signal to produce a coupled optical signal. The coupled optical signal is supplied from the output terminal 454c of the optical coupler 454 to the input terminal 455a of the semiconductor optical amplifier 455.

The semiconductor optical amplifier 455 produce a gain upon inputting a current thereto. However, a driving circuit for inputting the current to the semiconductor optical amplifier 455 is herein omitted from FIG. 7. The semiconductor optical amplifier 455 optically amplifies the coupled optical signal into an amplified optical signal in the manner which will be described as the description proceeds. Although a detailed description of the semiconductor optical amplifier 455 will later be made, a brief description of the semiconductor optical amplifier 455 will presently be made.

That is, the semiconductor optical amplifier 455 optically amplifies an optical signal having the input wavelength in the coupled optical signal as is. The semiconductor optical amplifier 455 optically amplifies an optical signal having the oscillation wavelength in the coupled optical signal with bit logic in the optical signal having the input wavelength inverted. The amplified optical signal is supplied from the output terminal 455b of the semiconductor optical amplifier 455 to the input terminal 456a of the variable wavelength optical filter 456.

The variable wavelength optical filter 456 is set with a transmission wavelength. The variable wavelength optical filter 456 may be implemented by an interference film filter. Under the circumstances, the variable wavelength optical filter 456 can vary the transmission wavelength by changing an incident angle of the amplified optical signal for the interference film filter. In the example being illustrated, the variable wavelength optical filter 456 varies the transmission wavelength to one of the input wavelength of the input optical signal and the oscillation wavelength of the semiconductor laser 455. The variable wavelength optical filter 456 optically filters the amplified optical signal so as to transmit, as a transmitted optical signal, an optical signal having the transmission wavelength in the amplified optical signal.

The variable wavelength optical filter 456 is supplied with the reception instruction signal ISr from the information processing unit 460 (FIG. 5). The variable wavelength optical filter 456 uses the input wavelength as the transmission wavelength when the reception instruction signal ISr indicates the noninverting of the bit logic for the main optical signal. On the other hand, the variable wavelength optical filter 456 uses the oscillation wavelength as the transmission wavelength when the reception instruction signal ISr indicates the inverting of the bit logic for the main optical signal.

In the example being illustrated, the transmitted optical signal is a digital-intensity modulated optical signal which is obtained by digital-intensity modulating an original optical signal by using original data. The transmitted optical signal is supplied from the output terminal 456b of the variable wavelength optical filter 456 to the input terminal 557a of the optical receiving unit 457. In the manner known in the art, the optical receiving unit 457 converts the transmitted optical signal into a transmitted electrical signal. The transmitted electrical signal is supplied from the output terminal 457b of the optical receiving unit 457 to the apparatus output terminal 450b. The apparatus output terminal 450b produces the transmitted electrical signal as the reception data RD. That is, the apparatus output terminal 450a serves as an arrangement for producing the transmitted electrical signal as the reception data RD. The reception data RD is supplied to the information processing unit 460 (FIG. 5).

Initialization for the optical signal converting apparatus 450 is carried out as follows. The apparatus input terminal 450a is supplied with no optical signal. The electrical switch 451 is turned on. In this event, the semiconductor optical amplifier 455 is put into a saturated state of the gain. For the purpose, a driving current for the semiconductor optical amplifier 455 and an input current for the semiconductor laser 453 are preliminarily controlled.

With this structure, it is possible to receive the input optical signal at the optical receiving unit 457 with a normal bit logic by turning the electrical switch 451 on or off although the optical signal receiving apparatus 450 is supplied with, as the input optical signal, either the inverted optical signal or the noninverted optical signal.

Now, description will be made as regards operation of the optical signal receiving apparatus 450.

As first, description will be made as regards operation in a case where the optical signal receiving apparatus 450 is supplied with the inverted optical signal as the input optical signal. In this event, in order to make the apparatus output terminal 450b produce the electrical signal with the normal bit logic, it is necessary to make the optical receiving unit 457 input one where the bit logic of the input optical signal is inverted. Accordingly, the information processing unit 460 (FIG. 5) supplies the optical signal receiving apparatus 450 with the reception instruction signal ISr indicative of the inverting of the bit logic for the input optical signal or the main optical signal. Responsive to the reception instruction signal ISr, the electrical switch 451 is turned on to input the current into the semiconductor laser 453 and therefore to place the semiconductor laser 453 into an oscillating state. Accordingly, the semiconductor laser 453 oscillates a continuous oscillation optical signal having the oscillation wavelength. The continuous oscillation optical signal is inputted into the optical coupler 454. The optical coupler 454 optically couples the input optical signal with the continuous oscillation optical signal to produce the coupled optical signal. The coupled optical signal is supplied to the semiconductor optical amplifier 455. Under the circumstances, wavelength conversion occurs in the semiconductor optical amplifier 455 on the basis of the mutual gain modulation.

Description will be made as regards to the mutual gain modulation in the semiconductor optical amplifier 455. In the manner known in the art, the input optical signal carries data or a digital signal which comprises a set of marks and spaces. Each mark indicates that the digital signal has a logic value of "1" while each space indicates that the digital signal has a logic value of "0".

It will be assumed that the input optical signal having the mark or the logic value of "1" is supplied to the semiconductor optical amplifier 455 via the optical coupler 454. In this event, the semiconductor optical amplifier 455 has a reduced gain for the oscillation wavelength of the oscillation optical signal in the semiconductor laser 453 because of stimulated emission of the input optical signal. As a result, the semiconductor optical amplifier 455 does not produce the optical signal having a wavelength which is equal to the oscillation wavelength of the oscillation optical signal in the semiconductor laser 453. In other words, the semiconductor optical amplifier 455 produces the optical signal having the oscillation wavelength that has reduced power.

It will be presumed that the input optical signal having the space or the logic value of "0" is supplied to the semiconductor optical amplifier 455 via the optical coupler 454. Under the circumstances, the semiconductor optical amplifier 455 produces the oscillation optical signal having oscillation wavelength.

In addition, the variable wavelength optical filter 456 is set, in response to the reception instruction signal ISr, with the transmission wavelength which is equal to the oscillation wavelength in the semiconductor laser 453. In this event, the variable wavelength optical filter 456 produces, as the transmitted optical signal, the optical signal where the bit logic of the input optical signal is inverted. Accordingly, the input optical signal is converted to the transmitted optical signal which has the oscillation wavelength in the semiconductor laser 453 and which has the bit logic inverted from that of the input optical signal.

Subsequently, description will be made as regards operation in a case where the optical signal receiving apparatus 450 is supplied with the noninverted optical signal as the input optical signal. In this event, in order to make the apparatus output terminal 450b produce the electrical signal with the normal bit logic, it is necessary to make the optical receiving unit 457 input one where the bit logic of the input optical signal is not inverted. Accordingly, the information processing unit 460 (FIG. 5) supplies the optical signal receiving apparatus 450 with the reception instruction signal ISr indicative of the noninverting of the bit logic for the input optical signal or the main optical signal.

Responsive to the reception instruction signal ISr, the electrical switch 451 is turned off to stop the current flow into the semiconductor laser 453 and therefore to set the semiconductor laser 453 into an unoscillating state. Accordingly, the semiconductor laser 453 does not oscillate a continuous oscillation optical signal having the oscillation wavelength. The continuous oscillation optical signal is not inputted into the optical coupler 454. Accordingly, the input optical signal only is supplied to the semiconductor optical amplifier 455. Under the circumstances, the mutual gain modulation does not occur in the semiconductor optical amplifier 455 and therefore the semiconductor optical amplifier 455 carries out only a normal optical amplification on the input optical signal.

In addition, responsive to the reception instruction signal ISr, the variable wavelength optical filter 456 is set with the input wavelength of the input optical signal as the transmission wavelength. In this event, the variable wavelength optical filter 456 produces, as the transmitted optical signal, the optical signal where the bit logic of the input optical signal is not inverted. In other words, the input optical signal is converted to the transmitted optical signal which has the input wavelength in the input optical signal and which has the bit logic without inverting that of the input optical signal.

As a result, it is possible to carry out switching of inverting/noninverting for the optical signal by turning the electrical switch 451 on or off in place of using the optical switch 451" and the optical branching unit 451' in the conventional optical signal receiving apparatus 450' illustrated in FIG. 2.

Although it is possible for a variable wavelength optical filter for use in a normal wavelength converting unit to match the transmission wavelength of the variable wavelength optical filter with the oscillation wavelength of the continuous oscillation optical signal oscillated by the semiconductor laser 453 or the like alone, it is possible for the optical signal receiving apparatus 450 illustrated in FIG. 7 to match the transmission wavelength of the variable wavelength optical filter 456 with the input wavelength of the input optical signal as well as the oscillation wavelength in the semiconductor laser 453. As a result, it is possible for the optical signal receiving apparatus 450 illustrated in FIG. 7 to switch between the inverting/noninverting of the bit logic of the input optical signal.

The optical signal receiving apparatus 450 has various effects in comparison with the conventional optical receiving apparatus 450' illustrated in FIG. 2 as follows. That is, it is unnecessary for the optical signal receiving apparatus 450 to provide the optical branching unit 451', the optical switch 451" and so on which are required in the conventional optical receiving apparatus 450'. As a result, it is possible to decrease optical loss due to the optical switch 451" or the like. Accordingly, the transmitted optical signal supplied to the optical receiving unit 457 has a larger optical power than that supplied to the optical receiving unit 457 in the conventional signal receiving apparatus 450' illustrated in FIG. 2. As a result, it is unnecessary to use a highly sensitive optical receiving unit 457 and results in decreasing cost of product.

In addition, inasmuch as there is no need to provide with the optical branching unit 451' and the optical switch 451", the optical signal receiving apparatus 450 is advantageous in that it is possible to reduce packaging volume. Furthermore, inasmuch as a combination of the optical switch 451" and the optical branching unit 451' is more expensive than the electric switch 431, the optical signal receiving apparatus 450 is a lower cost than that of the conventional signal receiving apparatus 450' by the cast differential between those parts. Inasmuch as the semiconductor optical amplifier 455 is disposed prior to the optical receiving unit 457, it is possible to make the semiconductor optical amplifier 455 carry a role of a preamplifier in the optical receiving unit 457. It is therefore possible to lower performance required in the preamplifier of the optical receiving unit 457 in a subsequent stage.

Inasmuch as noises in an optical signal is cut off by the variable wavelength optical filter 456 in the optical signal receiving apparatus 450, it is unnecessary for the optical receiving unit 457 to provide an optical filter for cutting noises. Alternatively, such an optical filter in the optical receiving unit 457 is reduced and is low cost.

It will be assumed that the optical receiving unit 457 has sensitivity which has characteristics dependent on wavelengths. In other words, the optical receiving unit 457 has a sensitivity peak at a particular wavelength. Under the circumstances, the particular wavelength is used as the oscillation wavelength in the semiconductor laser 453 and the transmission wavelength in the variable wavelength optical filter 456. In addition, the electrical switch is put into an ON state. In this event, the input optical signal is converted into the transmitted optical signal having the particular wavelength related to the sensitivity peak. As a result, it is possible to excellently receive the transmitted optical signal by the optical receiving unit 457.

It is possible to detect an optical component of stimulated emission in the input optical signal by matching the transmission wavelength of the variable wavelength optical filter 456 with the input wavelength of the input optical signal although the current for the semiconductor laser 453 is not put into an OFF state. However, it is possible to suppress optical components of noises caused by operation of the semiconductor laser 453 especially by putting the current for the semiconductor laser 453 into the OFF state on inputting of the input optical signal. As a result, it is possible to excellently receive the transmitted optical signal by the optical receiving unit 457.

Figure 8:
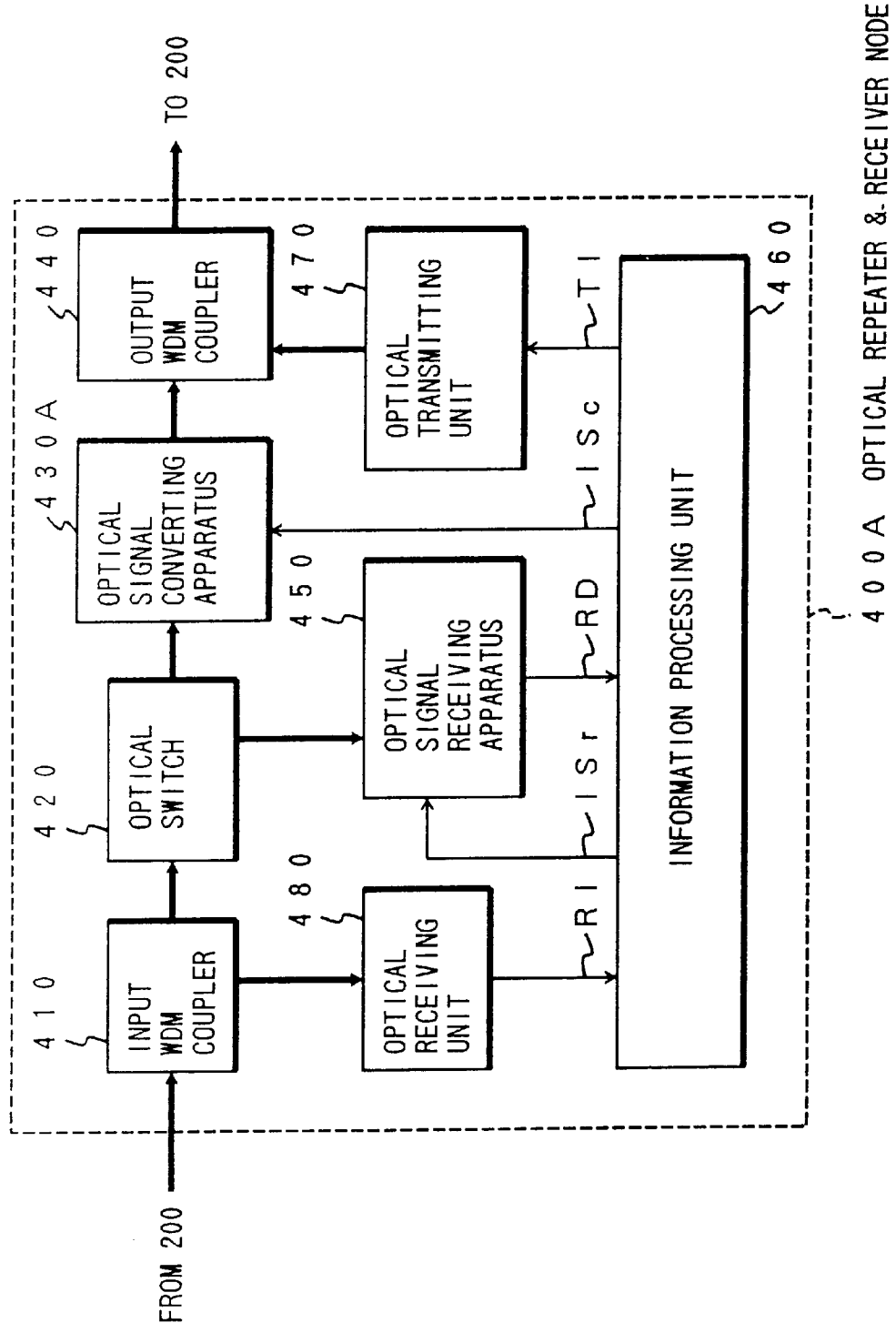
FIG. 8 is a block diagram of an optic al repeater and receiver node according to a second embodiment of this invention for use in the optical communication network system illustrated in FIG. 3.

Turning to FIG. 8, description will proceed to another optical repeater and receiver node 400A. In FIG. 8, each of the fine or thin lines indicates an electric wire while each of the thick or bold line arrows indicates a direction of the flow of light. The optical repeater and receiver node 400A is similar in structure and operation to the optical repeater and receiver node 400 illustrated in FIG. 5 except that the optical signal converting apparatus is modified from that illustrated in FIG. as will later become clear. The optical signal converting apparatus is therefore depicted at 430A.

Figure 9:
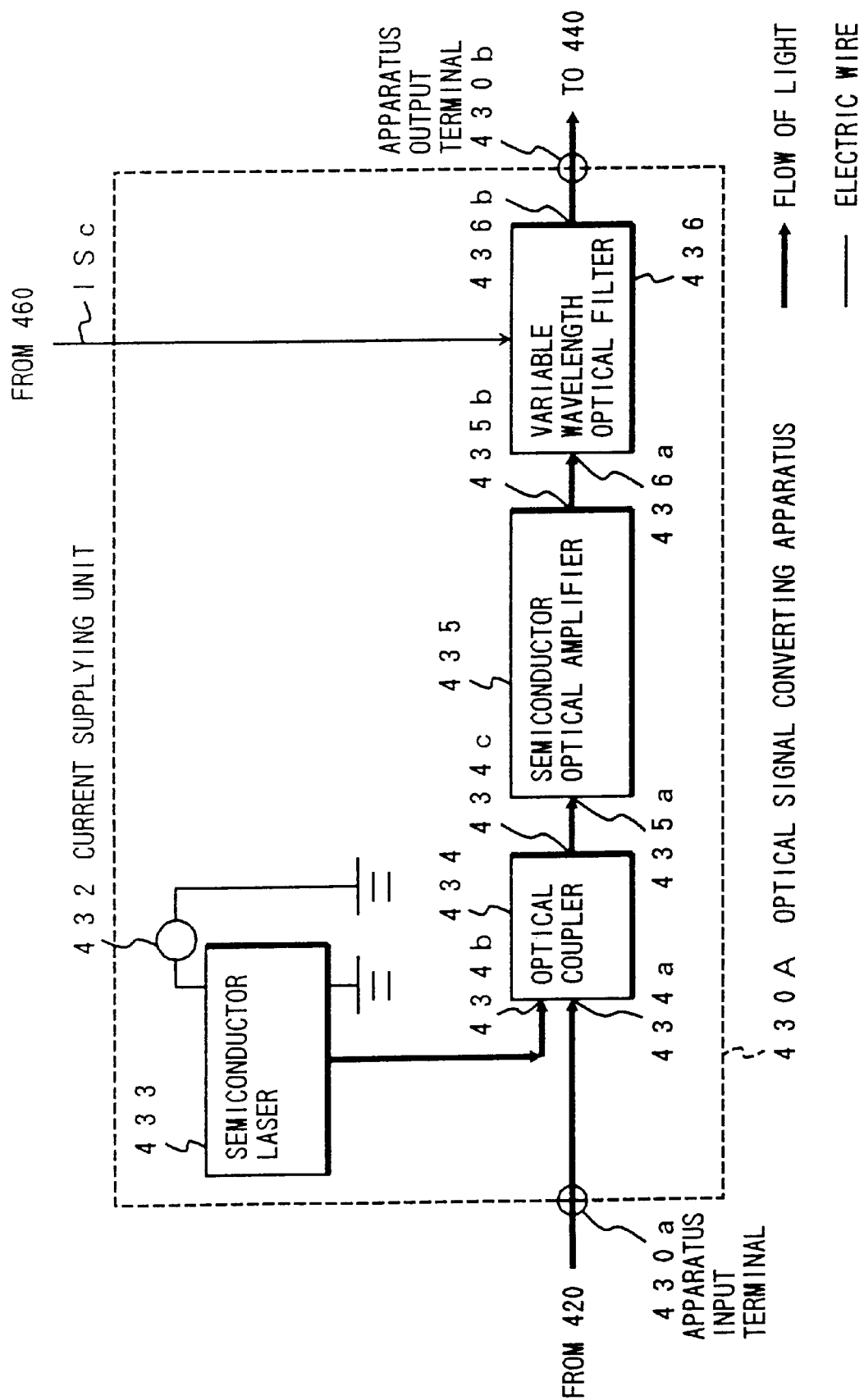
FIG. 9 is a block diagram of another optical signal converting apparatus for use in the optical repeater and receiver node illustrated in FIG. 8.

Turning to FIG. 9, description will proceed to the optical signal converting apparatus 430A illustrated in FIG. 8. In FIG. 9, each of the fine or thin lines indicates an electric wire while each of the thick or bold line arrows indicates a direction of the flow of light. The optical signal converting apparatus 430A has the apparatus input terminal 430*a* and the apparatus output terminal 430*b*. The apparatus input terminal 430*a* is for inputting the input optical signal having the input wavelength from the optical switch 420 (FIG. 8). The apparatus output terminal 430*b* is for outputting the output optical signal having the output wavelength to the output WDM coupler 440 (FIG. 8).

The illustrated optical signal converting apparatus 430A is similar in structure and operation to the optical signal converting apparatus 430 illustrated in FIG. 6 except that the electrical switch 431 is omitted from the optical signal converting apparatus 430.

With this structure, the semiconductor laser 433 always continues to oscillate the oscillation optical signal having the oscillation wavelength. Inasmuch as the semiconductor laser 433 is put into the oscillating state, the mutual gain modulation occurs. However, it is possible to match the transmission wavelength of the variable wavelength optical filter 436 with the input wavelength of the input optical signal. As a result, it is possible to extract an optical signal of stimulated emission caused by the input optical signal although the semiconductor laser 433 is put into the oscillating state. However, it is impossible to separate or demultiplex the amplified optical signal into an optical signal having the input wavelength and an optical signal having the oscillation wavelength by the variable wavelength optical filter 436 in a case where the oscillation wavelength in the semiconductor laser 433 coincides with the input wavelength of the input optical signal. Accordingly, it is possible for the optical signal converting apparatus 430A to use under the condition that the oscillation wavelength in the semiconductor laser 433 coincides with the input wavelength of the input optical signal.

The optical signal converting apparatus 430A has not only similar effects in the optical signal converting apparatus 430 illustrated in FIG. 6 but also an effect of cost reduction.

Figure 10:
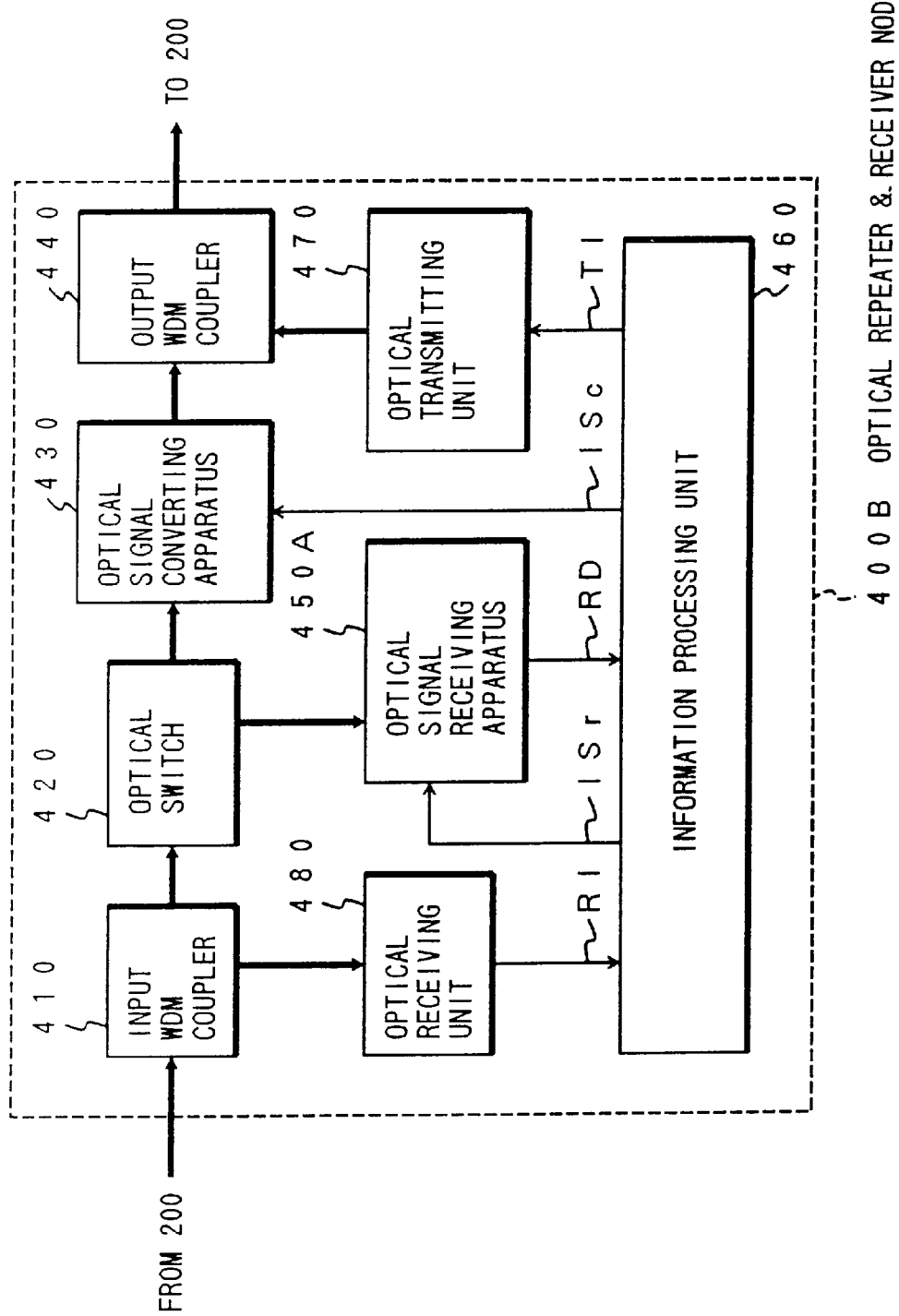
FIG. 10 is a block diagram of an optical repeater and receiver node according to a third embodiment of this invention for use in the optical communication network system illustrated in FIG. 3.

Turning to FIG. 10, description will proceed to still another optical repeater and receiver node 400B. In FIG. 10, each of the fine or thin lines indicates an electric wire while each of the thick or bold line arrows indicates a direction of the flow of light. The optical repeater and receiver node 400B is similar in structure and operation to the optical repeater and receiver node 400 illustrated in FIG. 5 except that the optical signal receiving apparatus is modified from that illustrated in FIG. 5 as will later become clear. The optical signal receiving apparatus is therefore depicted at 450A.

Figure 11:
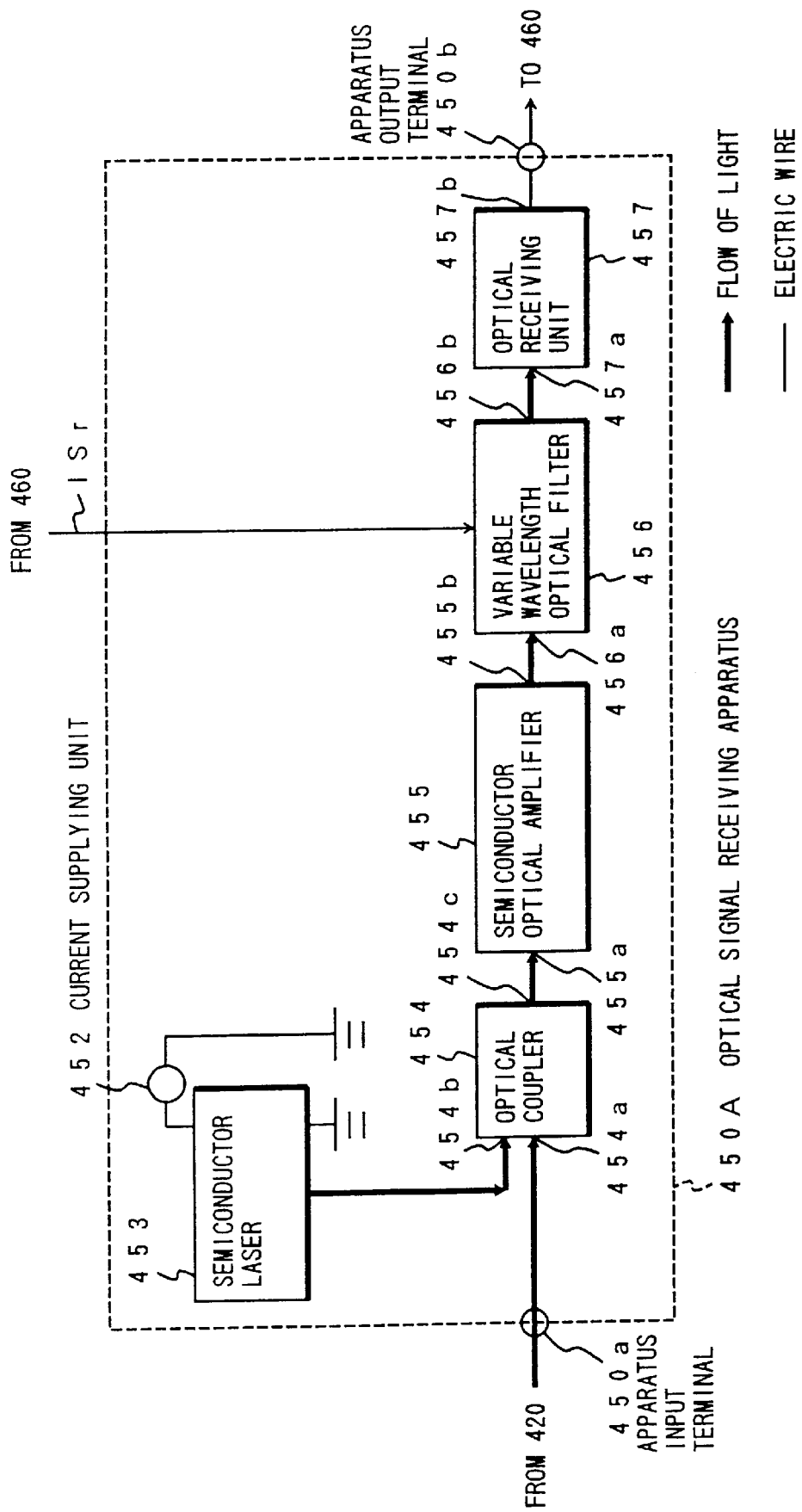
FIG. 11 is a block diagram of another optical signal receiving apparatus for use in the optical repeater and receiver node illustrated in FIG. 10.

Turning to FIG. 11, description will proceed to the optical signal receiving apparatus 450A illustrated in FIG. 10. In FIG. 11, each of the fine or thin lines indicates an electric wire while each of the thick or bold line arrows indicates a direction of the flow of light. The optical signal receiving apparatus 450A has the apparatus input terminal 450*a* and the apparatus output terminal 450*b*. The apparatus input terminal 450*a* is for inputting the input optical signal having the input wavelength from the optical switch 420 (FIG. 10). The apparatus output terminal 430*b* is for outputting the output optical signal having the output wavelength to the output WDM coupler 440 (FIG. 10).

The illustrated optical signal receiving apparatus 450A is similar in structure and operation to the optical signal receiving apparatus 450 illustrated in FIG. 7 except that the electrical switch 451 is omitted from the optical signal receiving apparatus 450.

With this structure, the semiconductor laser 453 always continues to oscillate the oscillation optical signal having the oscillation wavelength. Inasmuch as the semiconductor laser 453 is put into the oscillating state, the mutual gain modulation occurs. However, it is possible to match the transmission wavelength of the variable wavelength optical filter 456 with the input wavelength of the input optical signal. As a result, it is possible to extract an optical signal of stimulated emission caused by the input optical signal although the semiconductor laser 453 is put into the oscillating state.

Inasmuch as the electrical switch 451 does not exist, the continuous oscillation optical signal always continues to pour flow from the semiconductor laser 453 to the semiconductor optical amplifier 455 and therefore noises occur on reception of the noninverted optical signal as the input optical signal. Accordingly, it is possible for the optical signal receiving apparatus 450A to apply in a case where the variable wavelength optical filter 456 can cut the noises and the optical receiving unit 457 can receive the transmitted optical signal, which the noises are cut by the variable wavelength optical filter 456, without bit error.

The optical signal receiving apparatus 450A has not only similar effects in the optical signal receiving apparatus 450 illustrated in FIG. 7 but also an effect of cost reduction.

Figure 12:
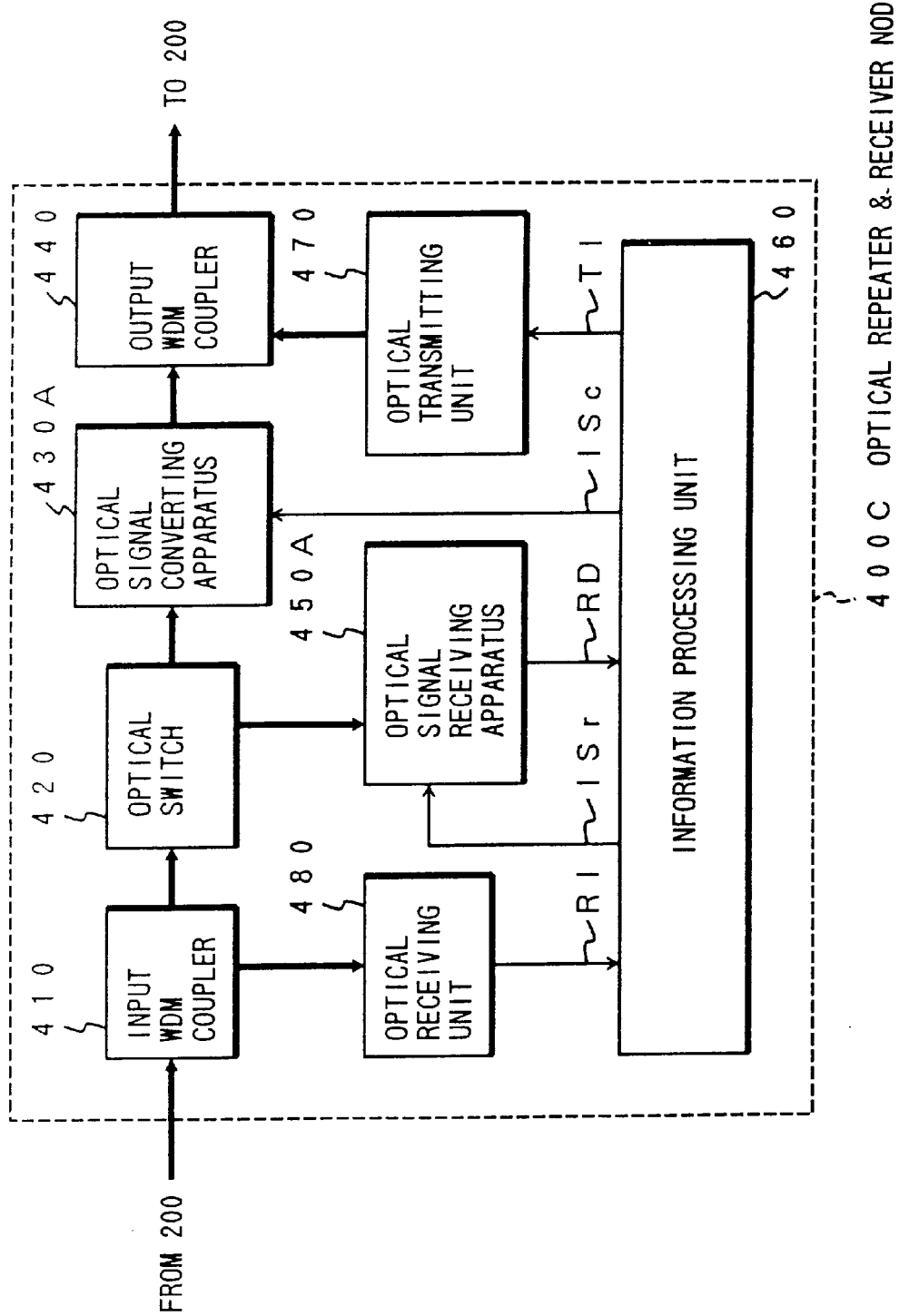
FIG. 12 is a block diagram of an optical repeater and receiver node according to a fourth embodiment of this invention for use in the optical communication network system illustrated in FIG. 3.

Turning to FIG. 12, description will proceed to yet another optical repeater and receiver node 400C. In FIG. 12, each of the fine or thin lines indicates an electric wire while each of the thick or bold line arrows indicates a direction of the flow of light. The optical repeater and receiver node 400C is similar in structure and operation to the optical repeater and receiver node 400 illustrated in FIG. 5 except that the optical signal receiving apparatus is modified from the optical signal converting apparatus 430 illustrated in FIG. 5 to the optical signal converting apparatus 430A illustrated in FIG. 9 and the optical signal receiving apparatus is modified from the optical signal receiving apparatus 450 illustrated in FIG. 5 to the optical signal receiving apparatus 450A illustrated in FIG. 11.

Figure 13:
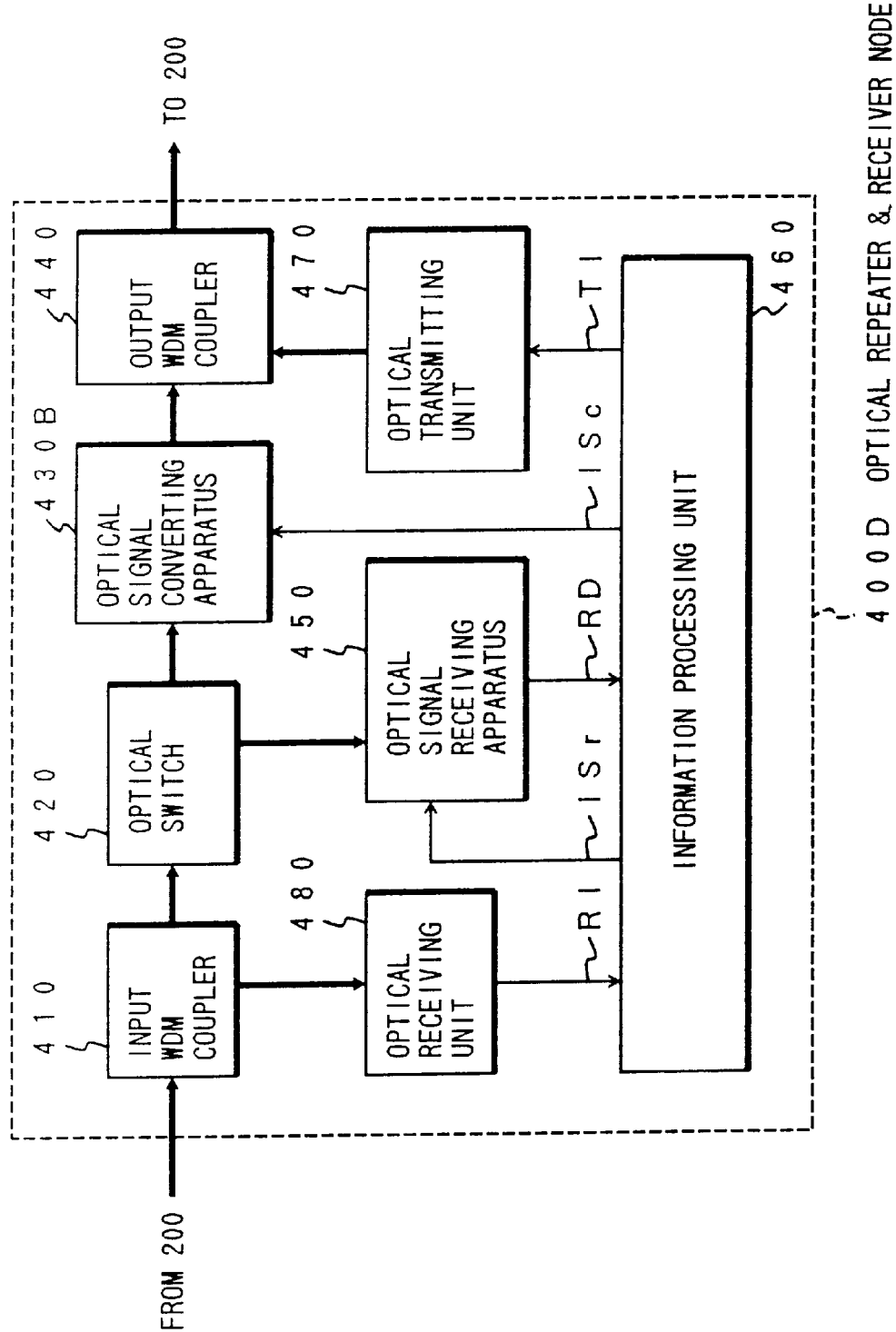
FIG. 13 is a block diagram of an optical repeater and receiver node according to a fifth embodiment of this invention for use in the optical communication network system illustrated in FIG. 3.

Turning to FIG. 13, description will proceed to a further optical repeater and receiver node 400D. In FIG. 13, each of the fine or thin lines indicates an electric wire while each of the thick or bold line arrows indicates a direction of the flow of light. The optical repeater and receiver node 400D is similar in structure and operation to the optical repeater and receiver node 400 illustrated in FIG. 5 except that the optical signal converting apparatus is modified from that illustrated in FIG. 5 as will later become clear. The optical signal converting apparatus is therefore depicted at 430B.

Figure 14:
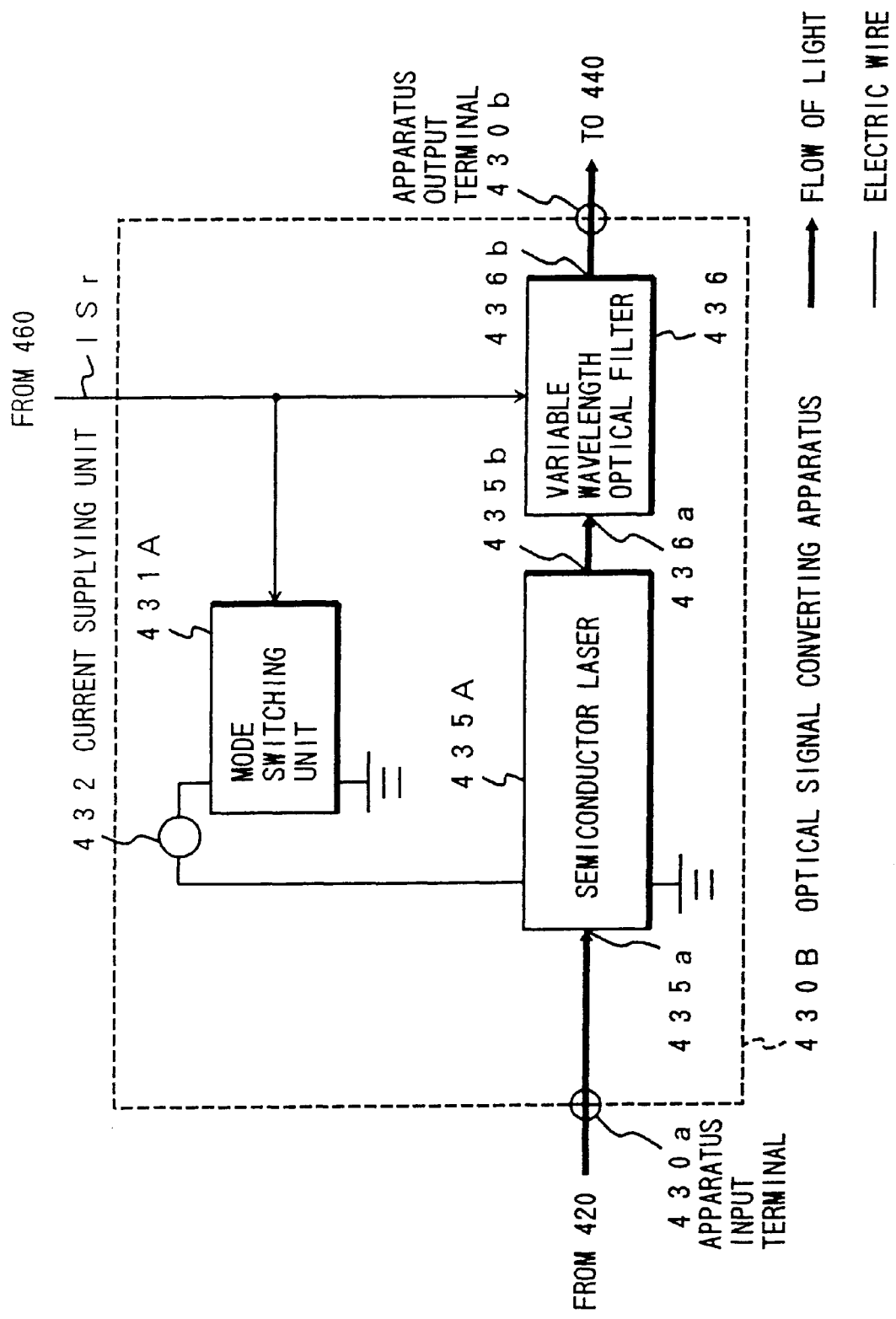
FIG. 14 is a block diagram of still another optical signal converting apparatus for use in the optical repeater and receiver node illustrated in FIG. 13.

Turning to FIG. 14, description will proceed to the optical signal converting apparatus 430D illustrated in FIG. 13. In FIG. 14, each of the fine or thin lines indicates an electric wire while each of the thick or bold line arrows indicates a direction of the flow of light. The optical signal converting apparatus 430D has the apparatus input terminal 430a and the apparatus output terminal 430b. The apparatus input terminal 430a is for inputting the input optical signal having the input wavelength from the optical switch 420 (FIG. 13). The apparatus output terminal 430b is for outputting the output optical signal having the output wavelength to the output WDM coupler 440 (FIG. 13).

The illustrated optical signal converting apparatus 430D is similar in structure and operation to the optical signal converting apparatus 430 illustrated in FIG. 6 except that the optical signal converting apparatus 430B comprises a mode switching unit 431A in lieu of the electrical switch 431 and another semiconductor laser 435A in place of a combination of the semiconductor laser 433, the optical coupler 434, and the semiconductor optical amplifier 435.

The apparatus input terminal 430a is connected to an input terminal 435a of the semiconductor laser 435A. The semiconductor laser 435A is connected to a series circuit of the current supplying unit 432 and the mode switching unit 431A. The semiconductor laser 435A has an output terminal 435b which is connected to the input terminal of the variable wavelength optical filter 436.

In the example being illustrated, the semiconductor laser 435A is a distributed feedback (DFB) type semiconductor laser. The mode switching unit 431A enables to change, in response to the conversion instruction signal ISc, a flow of current which is supplied from the current supplying unit 432 to the semiconductor laser 435A. As a result, the mode switching unit 431A can switch between an oscillating state and an unoscillating state in the semiconductor laser 435A. Specifically, the mode switching unit 431A switches the semiconductor laser 435A to the oscillating state when the conversion instruction signal ISc indicates the inverting of the bit logic for the input optical signal. When the conversion instruction signal ISc indicates the noninverting of the bit logic for the input optical signal, the mode switching unit 431A switches the semiconductor laser 435A to the unoscillating state. The mode switching unit 431A may be composed of resistors or the like.

At any rate, the semiconductor laser 435A serves as an optical oscillating and amplifying arrangement for oscillating the oscillation optical signal having the oscillation wavelength, and for optically amplifying the input optical signal as it is and for optically amplifying the oscillation optical signal with bit logic in the input optical signal inverted to produce the amplified optical signal. In addition, the mode switching unit 431A is operable as a mode setting arrangement for setting a mode for the optical oscillating and amplifying arrangement in one of an active mode for making the optical oscillating and amplifying arrangement supply the oscillation optical signal to an output and an inactive mode for stopping the optical oscillating and amplifying arrangement from supplying the oscillation optical signal as an output.

In the unoscillating state, the semiconductor laser 435A is set with a state having a gain. Specifically, when the current for the semiconductor laser 435A is set with a value which is slightly smaller than an oscillating threshold value of the semiconductor laser 435A, the semiconductor laser 435A is put into a state where oscillation stops and a state having the gain.

It will be assumed that the semiconductor laser 435A is put into the oscillating state. In this event, the mutual gain modulation occurs in the semiconductor laser 435A in the manner which is described above in conjunction with FIG. 7.

More specifically, when the input optical signal having the mark or the logic value of "1" is supplied to the semiconductor laser 435A, the semiconductor laser 435A has a reduced gain for the oscillation optical signal having the oscillation wavelength in the semiconductor laser 435A because of stimulated emission of the input optical signal. As a result, the semiconductorlaser435A stops oscillation thereof. On the other hand, the semiconductor laser 435A continues to oscillate when the input optical signal having the space or the logic value of "0" is supplied to the semiconductor laser 435A. Inasmuch as the variable wavelength optical filter 436 is set, in response to the conversion instruction signal ISc indicative of the inverting of the bit logic for the input optical signal, with the transmission wavelength which is equal to the oscillation wavelength in the semiconductor laser 435A, the variable wavelength optical filter 436 produces, as the transmitted optical signal, the optical signal where the bit logic of the input optical signal is inverted. Accordingly, the input optical signal is converted to the transmitted optical signal which has the oscillation wavelength in the semiconductor laser 435A and which has the bit logic inverted from that of the input optical signal.

It will be presumed that the semiconductor laser 435A is put into the unoscillating state. Under the circumstances, inasmuch as the semiconductor laser 435A has a little gain with the unoscillating state, the input optical signal supplied to the apparatus input terminal 430a passes through the semiconductor laser 435A. Inasmuch as the variable wavelength optical filter 436 is set, in response to the conversion instruction signal ISc indicative of the noninverting of the bit logic for the input optical signal, with the transmission wavelength which is equal to the input wavelength in the input optical signal, the variable wavelength optical filter 436 produces, as the transmitted optical signal, the optical signal where the bit logic of the input optical signal is not inverted. Accordingly, the apparatus output terminal 430a produces, as the output optical signal, the transmitted optical signal which has the input wavelength of the input optical signal and which has the bit logic coincident with that of the input optical signal.

Inasmuch as the semiconductor laser 435A is the DFB type semiconductor laser, it is impossible to make the DFB type semiconductor laser supply an optical signal having a Bragg wavelength thereto. Accordingly, it is necessary for the optical signal converting apparatus 430B to carry out in the condition that the input wavelength of the input optical signal supplied to the apparatus input terminal 430a is different from the oscillation wavelength in the semiconductor laser 435A.

The optical signal converting apparatus 430B has not only the effects described in conjunction with FIG. 6 but also effects of decreasing cost of product and of reducing a mounted space.

Figure 15:
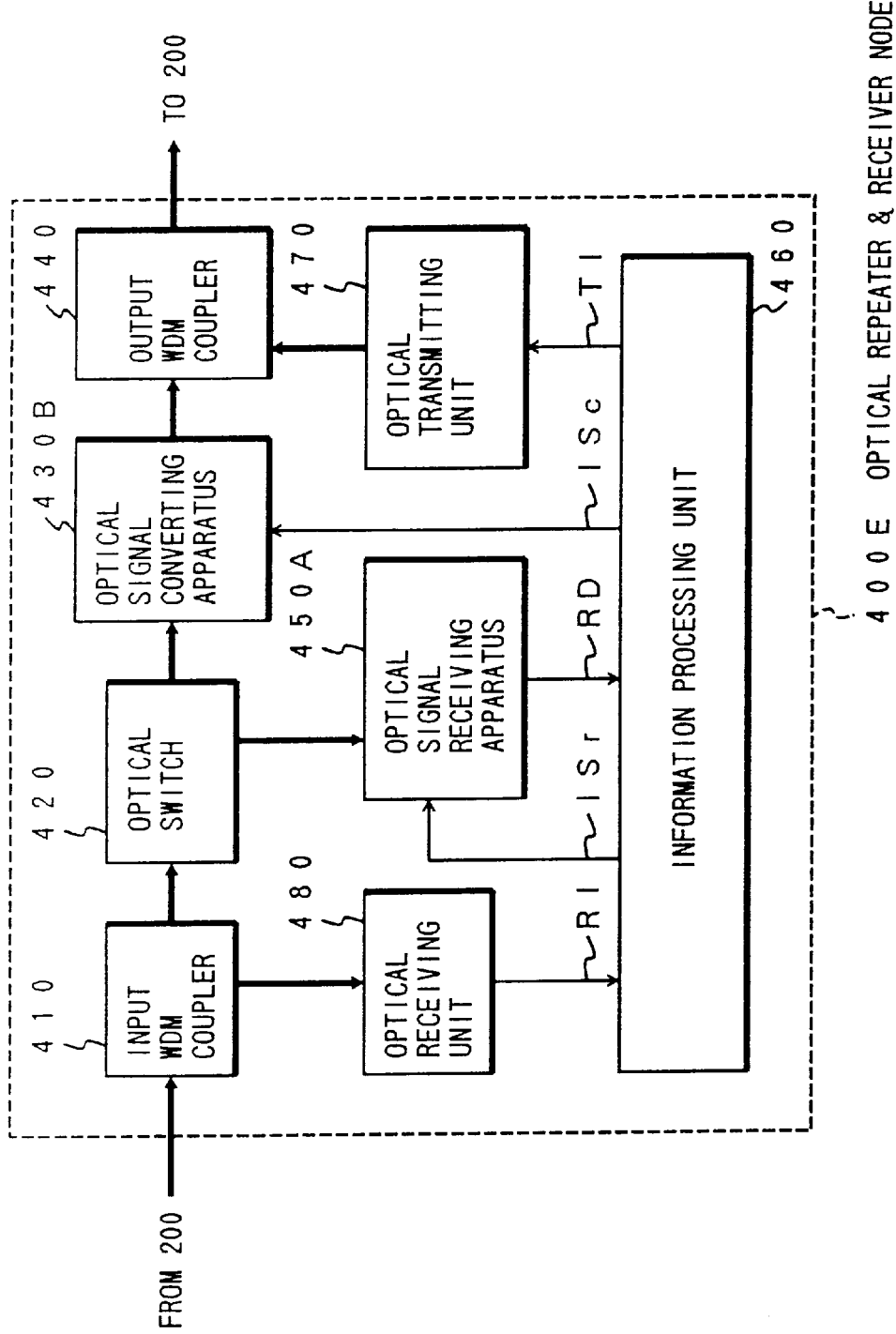
FIG. 15 is a block diagram of an optical repeater and receiver node according to a sixth embodiment of this invention for use in the optical communication network system illustrated in FIG. 3.

Turning to FIG. 15, description will proceed to a still further optical repeater and receiver node 400E. In FIG. 15, each of the fine or thin lines indicates an electric wire while each of the thick or bold line arrows indicates a direction of the flow of light. The optical repeater and receiver node 400E is similar in structure and operation to the optical repeater and receiver node 400D illustrated in FIG. 13 except that the optical signal receiving apparatus is modified from the optical signal receiving apparatus 450 illustrated in FIG. 5 to the optical signal receiving apparatus 450A illustrated in FIG. 11.

Figure 16:
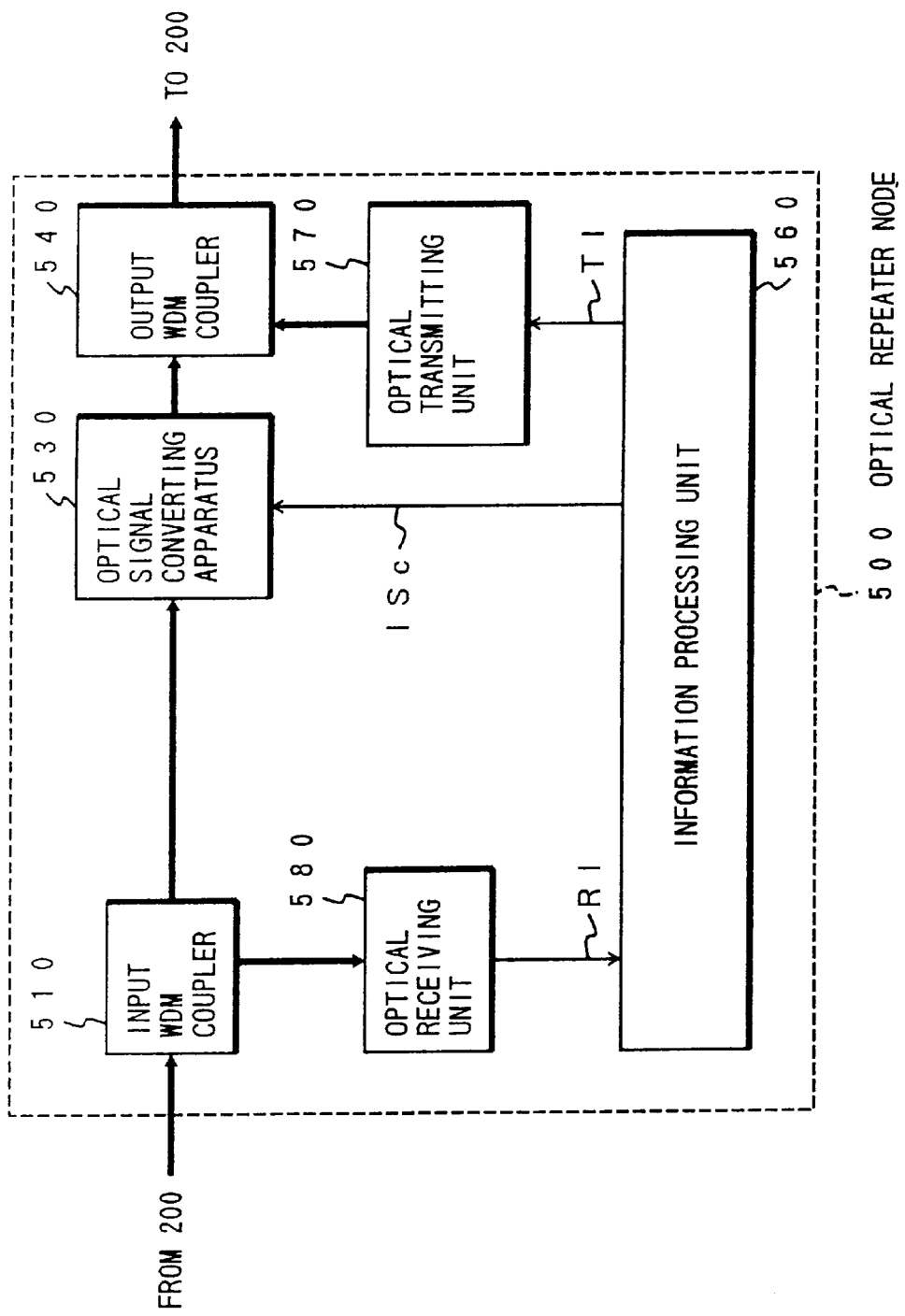
FIG. 16 is a block diagram of an optical repeater node according to a seventh embodiment of this invention for use in the optical communication network system illustrated in FIG. 3.

Turning to FIG. 16, description will proceed to the optical repeater node 500 illustrated in FIG. 3. In FIG. 16, each the fine or thin lines indicates an electric wire while each the thick or bold line arrows indicates a direction of the flow of light. The optical repeater node 500 is similar in structure and operation to the optical repeater and receiver node 400 illustrated in FIG. 5 except that the optical switch and the optical signal receiving apparatus are omitted from the optical repeater and receiver node 400. That is, the optical repeater node 500 comprises an input WDM coupler 510, an optical signal converting apparatus 530, an output WDM coupler 540, an information processing unit 560, an optical transmitting unit 570, and an optical receiving unit 580.

Demultiplexed or separated from the multiplexed optical signal by the input WDM coupler 410, the main optical signal is directly supplied from the input WDM coupler 410 to the optical signal converting apparatus 530.

Figure 17:
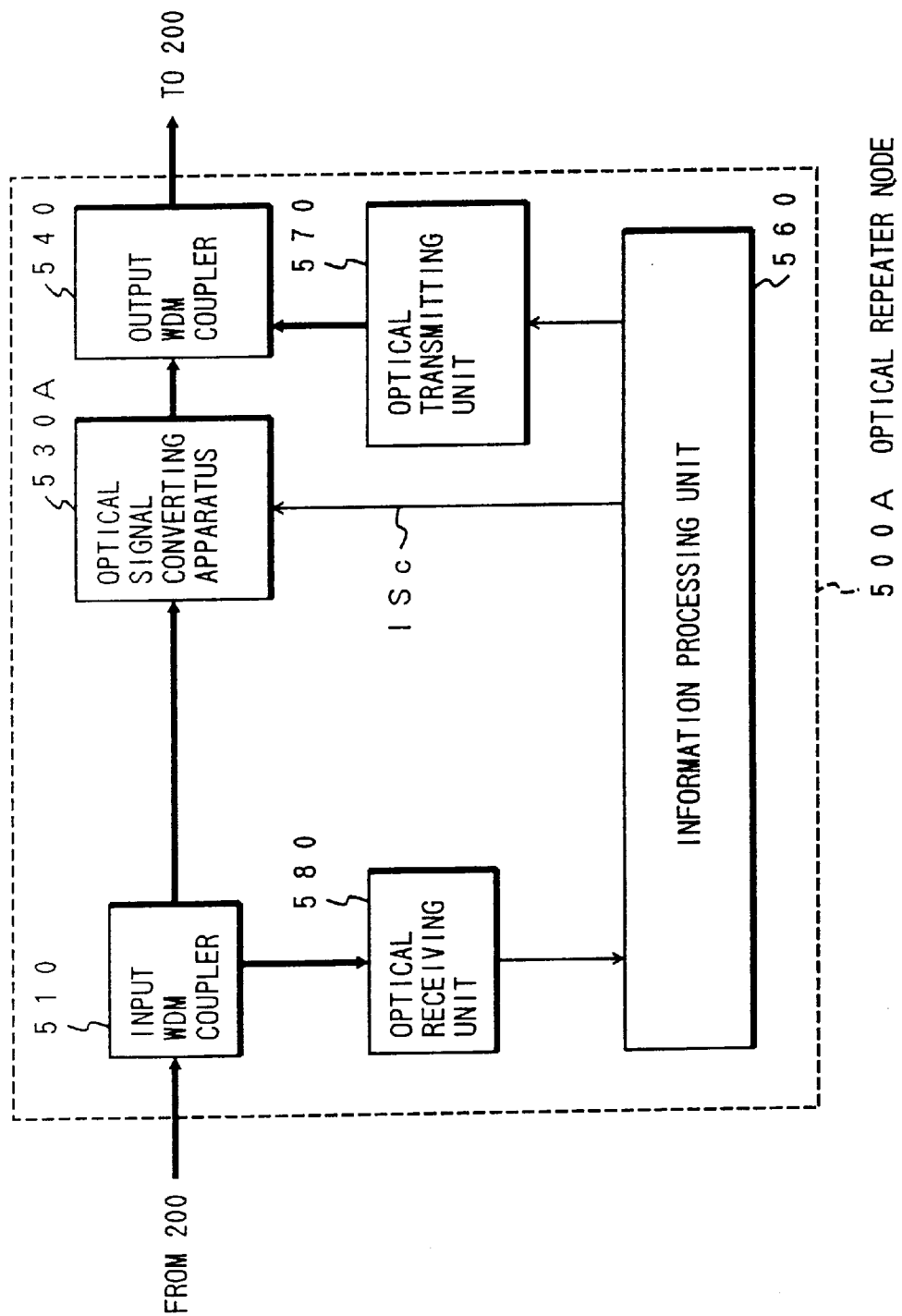
FIG. 17 is a block diagram of an optical repeater node according to an eighth embodiment of this invention for use in the optical communication network system illustrated in FIG. 3.

Turning to FIG. 17, description will proceed to another optical repeater node 500A. In FIG. 17, each the fine or thin lines indicates an electric wire while each the thick or bold line arrows indicates a direction of the flow of light. The optical repeater node 500A is similar in structure and operation to the optical repeater node 500 illustrated in FIG. 16 except that the optical signal converting apparatus is modified from the optical signal converting apparatus 530 like that illustrated in FIG. 6 to the optical signal converting apparatus 530A like that illustrated in FIG. 9.

Figure 18:
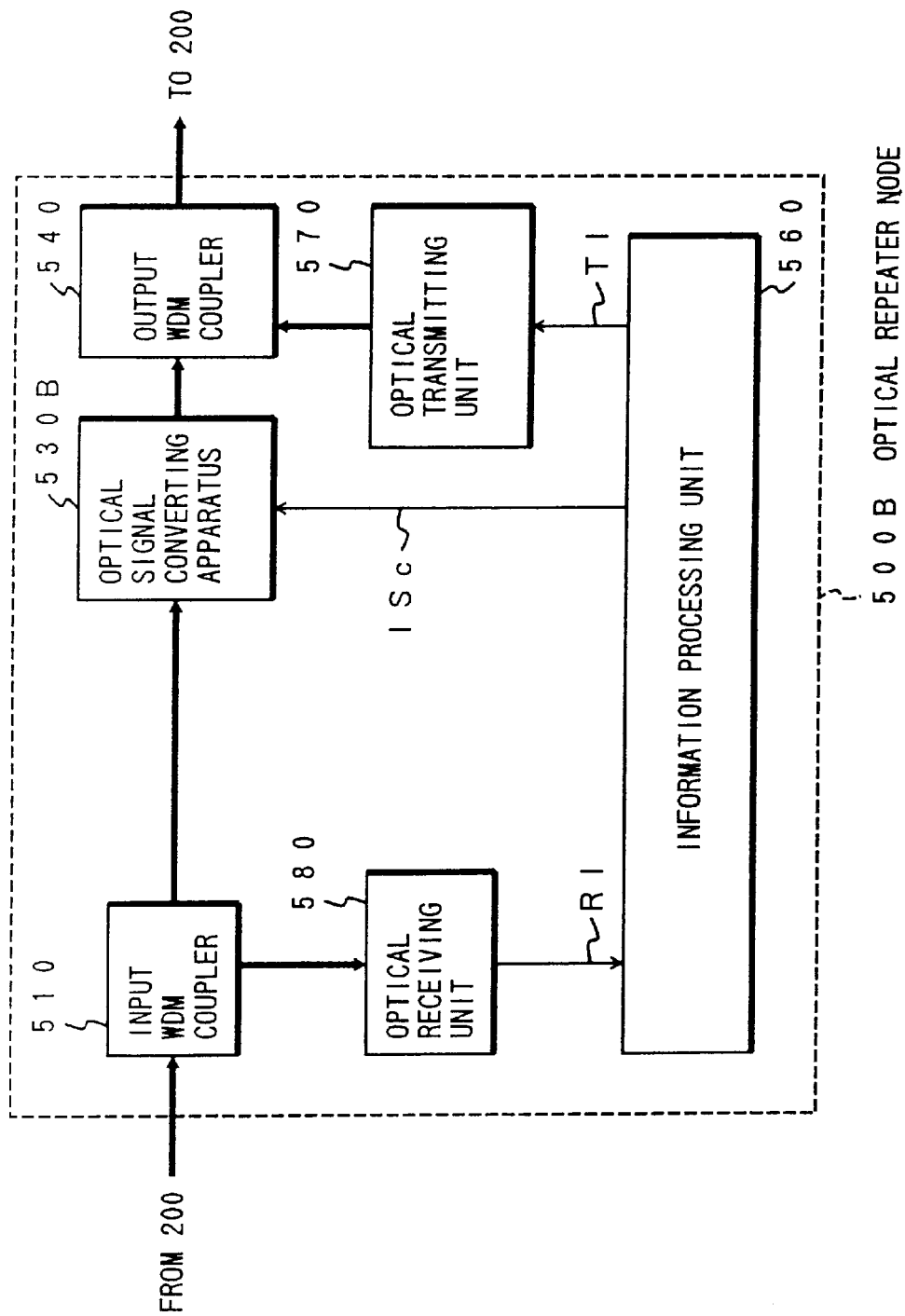
FIG. 18 is a block diagram of an optical repeater node according to a ninth embodiment of this invention for use in the optical communication network system illustrated in FIG. 3.

Turning to FIG. 18, description will proceed to still another optical repeater node 500B. In FIG. 18, each the fine or thin lines indicates an electric wire while each the thick or bold line arrows indicates a direction of the flow of light. The optical repeater node 500B is similar in structure and operation to the optical repeater node 500 illustrated in FIG. 16 except that the optical signal converting apparatus is modified from the optical signal converting apparatus 530 like that illustrated in FIG. 6 to the optical signal converting apparatus 530B like that illustrated in FIG. 14.

Figure 19:
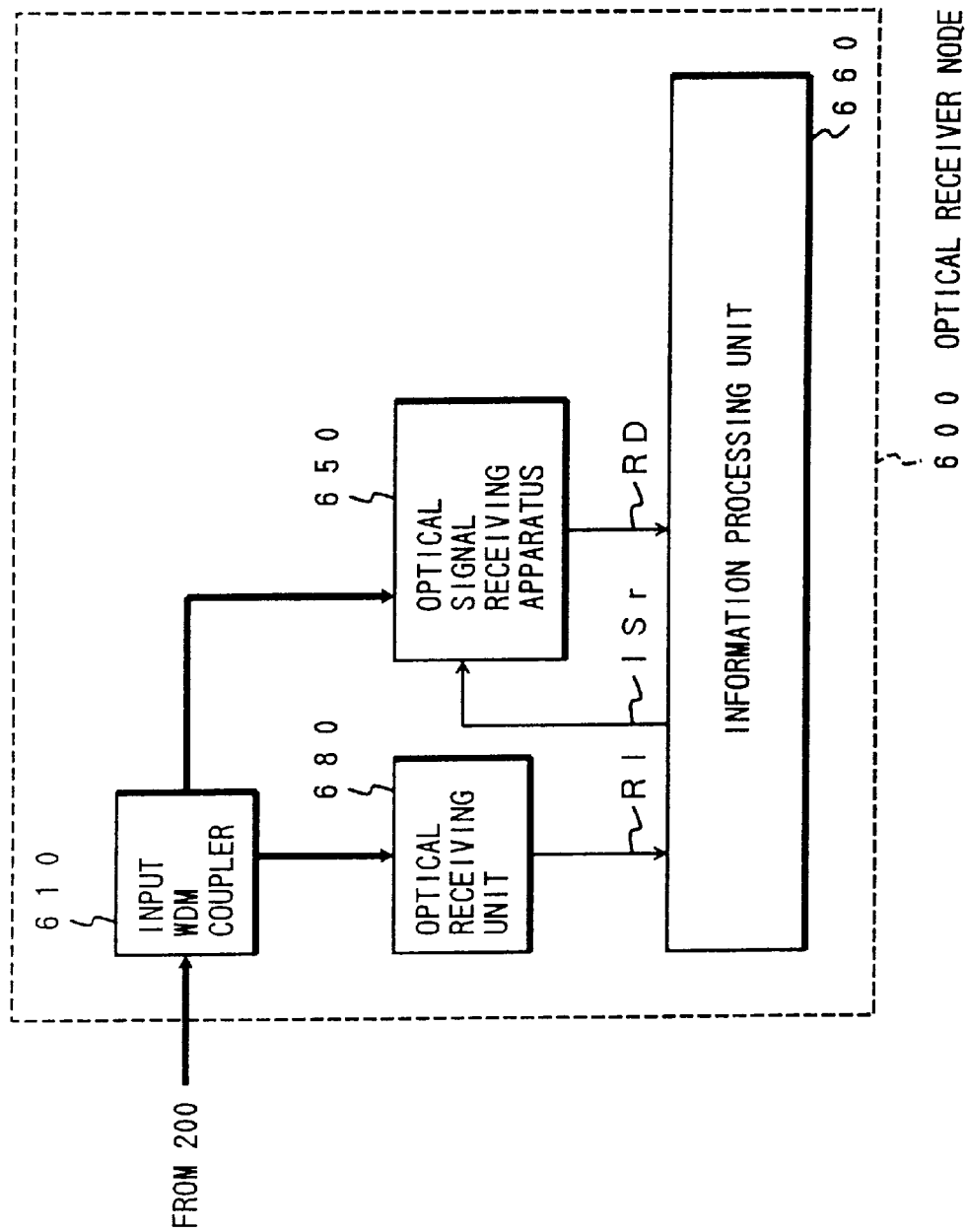
FIG. 19 is a block diagram of an optical receiver node according to a tenth embodiment of this invention for use in the optical communication network system illustrated in FIG. 3.

Turning to FIG. 19, description will proceed to the optical receiver node 600 illustrated in FIG. 3. In FIG. 19, each of the fine or thin lines indicates an electric wire while each of the thick or bold line arrows indicates a direction of the flow of light. The optical receiver node 600 is similar in structure and operation to the optical repeater and receiver node 400 illustrated in FIG. 5 except that the optical switch, the optical signal converting apparatus, the output WDM coupler, and the optical transmitting unit are omitted from the optical repeater and receiver node 400. That is, the optical receiver node 600 comprises an input WDM coupler 610, an optical signal receiving apparatus 650, an information processing unit 660, and an optical receiving unit 680.

Demultiplexed or separated from the multiplexed optical signal by the input WDM coupler 610, the main optical signal is directly supplied from the input WDM coupler 610 to the optical signal receiving apparatus 650.

Figure 20:
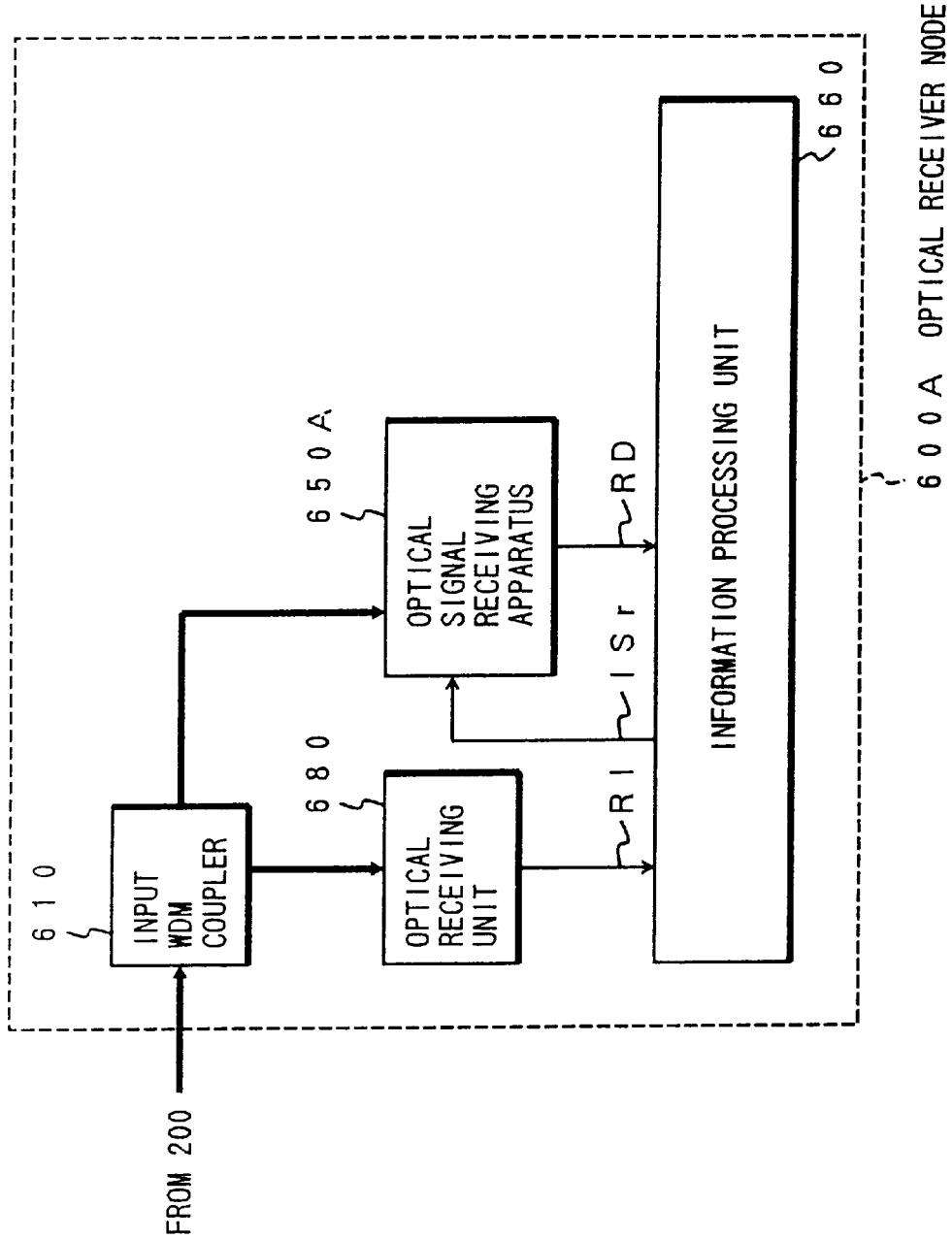
FIG. 20 is a block diagram of an optical receiver node according to an eleventh embodiment of this invention for use in the optical communication network system illustrated in FIG. 3.

Turning to FIG. 20, description will proceed to another optical receiver node 600A. In FIG. 20, each of the fine or thin lines indicates an electric wire while each of the thick or bold line arrows indicates a direction of the flow of light. The optical receiver node 600A is similar in structure and operation to the optical receiver node 600 illustrated in FIG. 19 except that the optical signal receiving apparatus is modified from the optical signal receiving apparatus 650 like that illustrated in FIG. 7 to the optical signal receiving apparatus 650A as illustrated in FIG. 11.

While this invention has thus far been described in conjunction with preferred embodiments thereof, it will now be readily possible for those skilled in the art to put this invention into various other manners. For example, although the monitor and control optical signal is transmitted with it wavelength multiplexed with the main optical signal in the above-mentioned embodiments, other transmitting means may be used to transmit monitor and control information such as a different path which is different from a path for transmitting the main optical signal. Although the space division optical switch is used as the optical switch 420 in the above-mentioned embodiments, a wavelength division optical switch may be used as the optical switch 420.

Although the semiconductor optical amplifier 435 or 455 is used as an optical amplifier in the above-mentioned embodiments, the optical amplifier is not restricted to the semiconductor optical amplifier and an optical amplifier having again operable at a faster response speed may be used. Although the semiconductor laser 433 or 453 is used as an optical oscillator, the optical oscillator is not restricted to the semiconductor laser and an optical oscillator enabling to oscillate an continuous optical signal may be used.

Although the effect of the mutual gain modulation in the semiconductor optical amplifier 435 or 455 is used in the above-mentioned embodiments, the present invention may carry out by using a mutual phase modulation in the semiconductor optical amplifier. This is because a wavelength converter using an effect of the mutual phase modulation in the semiconductor optical amplifier can carry out not only wavelength conversion with a continuous oscillation optical signal in addition to the input optical signal but also wavelength conversion with bit logic in the input optical signal inverted.

Although the mutual gain modulation in the semiconductor optical amplifier is used in the above-mentioned embodiments, it is clear that the present invention may be carried out without obstacle by using a method of using the mutual phase modulation in the semiconductor optical amplifier or a method of using four-wave mixing. However, it is possible for the method of using four-wave mixing to switch between a state where the wavelength conversion is carried out and another state where the wavelength conversion is not carried out because inversion of bit logic does not occur in the method of using four-wave mixing.

Although a wavelength conversion method using the mutual gain modulation is used in the above-mentioned embodiments, it is clear that the present invention may be carried out without obstacle by adding an optical source for the optical signal with an on/off function in a method where wavelength conversion and/or inversion of bit logic occurs caused by interaction between an input optical signal and an optical signal in an optical amplifier medium in a case where other wavelength conversion methods due to continuous oscillation signals.

Although switching between the inverting and the non-invering is carried out by turning the pouring current of the semiconductor laser acting as a optical source, it is clear that the present invention may be carried out without obstacle by using structure where ON/OFF of an optical signal for the semiconductor optical amplifier is switched by arranging an optical switch at an outgoing end of the semiconductor laser serving as the optical source.

Although a semiconductor laser having a fixed oscillation wavelength is used as the semiconductor laser operable as the optical source for use in the above-mentioned embodiments, it is obvious that the present invention may be carried out by using a semiconductor laser having a variable oscillation wavelength.

In addition, structure using a circulator may be applicable to this invention although any of the above-mentioned embodiments comprises structure without the circulator. In this event, the present invention may be carried out without obstacle in the manner which will be presently described. For example, in the structure illustrated in FIG. 7, a total reflective coating is applied to an end of the semiconductor optical amplifier 455 to form a total reflective end while a nonreflective coating is applied to another end of the semiconductor optical amplifier to form a nonreflective end. Both of the input optical signal and the continuous oscillation optical signal are incident on the nonreflective end of the semiconductor optical amplifier 455 and the circulator separates an optical signal reflected at the total reflective end from the input optical signal. In addition, the current of the semiconductor laser 453 is turned on or off.

What is claimed is:

1. An optical signal converting apparatus for converting an input optical signal having an input wavelength into an output optical signal having an output wavelength, said optical signal converting apparatus comprising:

an optical oscillator for oscillating an oscillation optical signal having an oscillation wavelength;

an optical coupler, supplied with the input optical signal and connected to said optical oscillator, for optically coupling the input optical signal and the oscillation optical signal to produce a coupled optical signal;

an optical amplifier, connected to said optical coupler, for optically amplifying the coupled optical signal into an amplified optical signal, said optical amplifier optically amplifying an optical signal having the input wavelength in the coupled optical signal as is, said optical amplifier optically amplifying another optical signal having the oscillation wavelength in the coupled optical signal with bit logic inverted from that of the optical signal having the input wavelength;

an optical filter, set with a transmission wavelength and connected to said optical amplifier, for optically filtering the amplified optical signal so as to transmit, as a transmitted optical signal, an optical signal having the transmission wavelength in the amplified optical signal;

a mode setting arrangement, connected to said optical oscillator, for setting a mode of said optical oscillator to be one of an active mode for making said optical oscillator output the oscillation optical signal and an inactive mode for stopping said optical oscillator from outputting the oscillation optical signal; and an output terminal, connected to said optical filter, for producing the transmitted optical as the output optical signal.

2. An optical signal converting apparatus as claimed in claim 1, wherein said optical filter is a variable wavelength optical filter which varies the transmission wavelength to be one of the input wavelength of said input optical signal and the oscillation wavelength of said optical oscillator.

3. An optical signal receiving apparatus for receiving an input optical signal having an input wavelength to produce reception data, comprising:

an optical oscillator for oscillating an oscillation optical signal having an oscillation wavelength;

an optical coupler, supplied with the input optical signal and connected to said optical oscillator, for optically coupling the input optical signal and the oscillation optical signal to produce a coupled optical signal;

an optical amplifier, connected to said optical coupler, for optically amplifying the coupled optical signal into an amplified optical signal, said optical amplifier optically amplifying an optical signal having the input wavelength in the coupled optical signal as is, said optical amplifier optically amplifying another optical signal having the oscillation wavelength in the coupled optical signal with bit logic inverted from that of the optical signal having the input wavelength;

an optical filter, set with a transmission wavelength and connected to said optical amplifier, for optically filtering the amplified optical signal so as to transmit, as a transmitted optical signal, an optical signal having the transmission wavelength in the amplified optical signal;

an optical receiving unit, connected to said optical filter, for receiving the transmitted optical signal to produce the reception data; and a mode setting arrangement, connected to said optical oscillator, for setting a mode of said optical oscillator to be one of an active mode for making said optical oscillator output the oscillation optical signal and an inactive mode for stopping said optical oscillator from outputting the oscillation optical signal.

4. An optical signal receiving apparatus as claimed in claim 3, wherein said optical filter is a variable wavelength optical filter which varies the transmission wavelength to be one of the input wavelength of said input optical signal and the oscillation wavelength of said optical oscillator.

5. An optical signal converting apparatus for converting an input optical signal having an input wavelength into an output optical signal having an output wavelength, said optical signal converting apparatus consisting essentially of:

an optical oscillator for oscillating an oscillation optical signal having an oscillation wavelength;

a current supplying unit for supplying current to said optical oscillator;

an apparatus input terminal through which the input optical signal is supplied;

an optical coupler supplied with the input optical signal and connected to said optical oscillator and said apparatus input terminal, for optically coupling the input optical signal and the oscillation optical signal to produce a coupled optical signal;

an optical amplifier, connected to said optical coupler, for optically amplifying the coupled optical signal into an amplified optical signal, said optical amplifier optically amplifying an optical signal having the input wavelength in the coupled optical signal as is, said optical amplifier optically amplifying another optical signal having the oscillation wavelength in the coupled optical signal with bit logic inverted from that of the optical signal having the input wavelength;

an optical filter, set with a transmission wavelength and connected to said optical amplifier, for optically filtering the amplified optical signal so as to transmit, as a transmitted optical signal, an optical signal having the transmission wavelength in the amplified optical signal; and an apparatus output terminal connected to said optical filter, for producing the transmitted optical signal as the output optical signal.

6. An optical signal converting apparatus as claimed in claim 5, wherein said optical filter is a variable wavelength optical filter which varies the transmission wavelength to be one of the input wavelength of said input optical signal and the oscillation wavelength of said optical oscillator.

7. An optical signal receiving apparatus for receiving an input optical signal having an input wavelength to produce reception data, consisting essentially of:

an optical oscillator for oscillating an oscillation optical signal having an oscillation wavelength;

a current supplying unit for supplying current to said optical oscillator;

an apparatus input terminal through which the input optical signal is supplied;

an optical coupler, supplied with the input optical signal and connected to said optical oscillator and said apparatus input terminal, for optically coupling the input optical signal and the oscillation optical signal to produce a coupled optical signal;

an optical amplifier, connected to said optical coupler, for optically amplifying the coupled optical signal into an amplified optical signal, said optical amplifier optically amplifying an optical signal having the input wavelength in the coupled optical signal as is, said optical amplifier, optically amplifying another optical signal having the oscillation wavelength in the coupled optical signal with bit logic inverted from that of the optical signal having the input wavelength;

an optical filter, set with a transmission wavelength and connected to said optical amplifier, for optically filtering the amplified optical signal so as to transmit, as a transmitted optical signal, an optical signal having the transmission wavelength in the amplified optical signal;

an optical receiving unit, connected to said optical filter, for receiving the transmitted optical signal to produce the reception data; and an apparatus output terminal connected to said optical receiving unit for outputting the reception data.

8. An optical signal receiving apparatus as claimed in claim 7, wherein said optical filter is a variable wavelength optical filter which varies the transmission wavelength to be one of the input wavelength of said input optical signal and the oscillation wavelength of said optical oscillator.

9. An optical signal converting apparatus for converting an input optical signal having an input wavelength into an output optical signal having an output wavelength, said optical signal converting apparatus comprising:

an optical oscillating and amplifying arrangement, supplied with the input optical signal, for oscillating an oscillation optical signal having an oscillation wavelength, said optical oscillating and amplifying arrangement optically amplifying the input optical signal as is and optically amplifying the oscillation optical signal with bit logic inverted from that of the input optical signal to produce an amplified optical signal;

an optical filter, set with a transmission wavelength and connected to said optical oscillating and amplifying arrangement, for optically filtering the amplified optical signal so as to transmit, as a transmitted optical signal, an optical signal having the transmission wavelength in the amplified optical signal;

a mode setting arrangement, connected to said optical oscillating and amplifying arrangement, for setting a mode of said optical oscillating and amplifying arrangement to be one of an active mode for making said optical oscillating and amplifying arrangement output the oscillation optical signal and an inactive mode for stopping said optical oscillating and amplifying means from outputting the oscillation optical signal; and an output terminal, connected to said optical filter, for producing the transmitted optical signal as the output optical signal.

10. An optical signal converting apparatus as claimed in claim 9, wherein said optical filter is a variable wavelength optical filter which varies the transmission wavelength to be one of the input wavelength of said input optical signal and the oscillation wavelength of said optical oscillator.

11. An optical communication network node comprising:

an information transmitting unit for transmitting transmission information used for monitoring and controlling a main optical signal;

an information receiving unit for receiving reception information used for monitoring and controlling the main optical signal;

an information processing unit, connected to said information transmitting unit and said information receiving unit, for processing the reception information to produce a conversion instruction signal to instruct whether bit logic for the main optical signal is to be inverted or not inverted and a reception instruction signal to instruct whether bit logic for the main optical signal is to be inverted or not inverted, said information processing unit supplying said information transmitting unit with the transmission information;

an optical signal converting apparatus, supplied with the main optical signal as an input optical signal having an input wavelength and connected to said information processing unit, for converting the input optical signal into an output optical signal having an output wavelength in response to the conversion instruction signal, said optical signal converting apparatus carrying out, in response to the conversion instruction signal, a switching operation between inverting and not inverting said bit logic for the main optical signal; and an optical signal receiving apparatus, supplied with the main optical signal as the input optical signal having the input wavelength and connected to said information processing unit, for receiving the input optical signal in response to the reception instruction signal to produce reception data, said optical signal receiving apparatus carrying out, in response to the reception instruction signal, a switching operation between inverting and not inverting said bit logic for the main optical signal.

12. An optical communication network node as claimed in claim 11, wherein said optical signal converting apparatus comprises:

an optical oscillator for oscillating an oscillation optical signal having an oscillation wavelength;

an optical coupler, supplied with the input optical signal and connected to said optical oscillator, for optically coupling the input optical signal and the oscillation optical signal to produce a coupled optical signal;

an optical amplifier, connected to said optical coupler, for optically amplifying the coupled optical signal into an amplified optical signal, said optical amplifier amplifying an optical signal having the input wavelength in the coupled optical signal as is, said optical amplifier amplifying another optical signal having the oscillation wavelength in the coupled optical signal with bit logic inverted from that of the optical signal having the input wavelength;

an optical filter, set with a transmission wavelength and connected to said optical amplifier and to said information processing unit, for optically filtering the amplified optical signal so as to transmit, as a transmitted optical signal, an optical signal having the transmission wavelength in the amplified optical signal, said optical filter being a variable wavelength optical filter which varies, in response to the conversion instruction signal, the transmission wavelength to be one of the input wavelength of said input optical signal and the oscillation wavelength of said optical oscillator, said optical filter using the input wavelength as the transmission wavelength when the conversion instruction signal instructs that said bit logic for the main optical signal is not to be inverted, said optical filter using the oscillation wavelength as the transmission wavelength when the conversion instruction signal instructs that said bit logic for the main optical signal is to be inverted;

a mode setting arrangement, connected to said optical oscillator and said information processing unit, for setting, in response to the conversion instruction signal, a mode of said optical oscillator to be one of an active mode for making said optical oscillator output the oscillation optical signal and an inactive mode for stopping said optical oscillator from outputting the oscillation optical signal, said mode setting arrangement setting the mode of said optical oscillator in the inactive mode when the conversion instruction signal instructs that said bit logic for the main optical signal is not to be inverted, said mode setting arrangement setting the mode of said optical oscillator in the active mode when the conversion instruction signal instructs that said bit logic for the main optical signal is to be inverted; and an output terminal, connected to said optical filter, for producing the transmitted optical signal as the output optical signal.

13. An optical communication network node as claimed in claim 11, wherein said optical signal converting apparatus comprises:

an optical oscillator for oscillating an oscillation optical signal having an oscillation wavelength;

an optical coupler, supplied with the input optical signal and connected to said optical oscillator, for optically coupling the input optical signal and the oscillation optical signal to produce a coupled optical signal;

an optical amplifier, connected to said optical coupler, for optically amplifying the coupled optical signal into an amplified optical signal, said optical amplifier amplifying an optical signal having the input wavelength in the coupled optical signal as is, said optical amplifier amplifying another optical signal having the oscillation wavelength in the coupled optical signal with bit logic inverted from that of the optical signal having the input wavelength;

an optical filter, set with a transmission wavelength and connected to said optical amplifier and to said information processing unit, for optically filtering the amplified optical signal so as to transmit, as a transmitted optical signal, an optical signal having the transmission wavelength in the amplified optical signal, said optical filter being a variable wavelength filter which varies, in response to the conversion instruction signal, the transmission wavelength to be one of the input wavelength of said input optical signal and the oscillation wavelength of said optical oscillator, said optical filter using the input wavelength as the transmission wavelength when the conversion instruction signal instructs that said bit logic for the main optical signal is not to be inverted, said optical filter using the oscillation wavelength as the transmission wavelength when the conversion instruction signal instructs that said bit logic for the main optical signal is to be inverted; and an output terminal, connected to said optical filter, for producing the transmitted optical signal as the output optical signal.

14. An optical communication network node as claimed in claim 11, wherein said optical signal converting apparatus comprises:

an optical oscillating and amplifying arrangement, supplied with the input optical signal, for oscillating an oscillation optical signal having an oscillation wavelength, said optical oscillating and amplifying arrangement optically amplifying the input optical signal as is and optically amplifying the oscillation optical signal with bit logic inverted from that of the input optical signal to produce an amplified optical signal;

an optical filter set with a transmission wavelength and connected to said optical oscillating and amplifying means and to said information processing unit, for optically filtering the amplified optical signal so as to transmit, as a transmitted optical signal, an optical signal having the transmission wavelength in the amplified optical signal, said optical filter being a variable wavelength optical filter which varies, in response to the conversion instruction signal, the transmission wavelength to be one of the input wavelength of said input optical signal and the oscillation wavelength of said optical oscillator, said optical filter using the input wavelength as the transmission wavelength when the conversion instruction signal instructs that said bit logic for the main optical signal is not to be inverted, said optical filter using the oscillation wavelength as the transmission wavelength when the conversion instruction signal instructs that said bit logic for the main optical signal is to be inverted;

a mode setting arrangement, connected to said optical oscillating and amplifying arrangement and to said information processing unit, for setting, in response to the conversion instruction signal, a mode of said optical oscillating and amplifying arrangement to be one of an active mode for making said optical oscillating and amplifying means output the oscillation optical signal and an inactive mode for stopping said optical oscillating and amplifying means from outputting the oscillation optical signal, said mode setting arrangement setting the mode of said optical oscillating and amplifying arrangement in the inactive mode when the conversion instruction signal instructs that said bit logic for the main optical signal is not to be inverted, said mode setting arrangement setting the mode of said optical oscillating and amplifying arrangement in the active mode when the conversion instruction signal instructs that said bit logic for the main optical signal is to be inverted; and an output terminal, connected to said optical filter, for producing the transmitted optical signal as the output optical signal.

15. An optical communication network node as claimed in claim 11, wherein said optical signal receiving apparatus comprises:

an optical oscillator for oscillating an oscillation optical signal having an oscillation wavelength;

an optical coupler, supplied with the input optical signal and connected to said optical oscillator, for optically coupling the input optical signal and the oscillation optical signal to produce a coupled optical signal;

an optical amplifier, connected to said optical coupler, for optically amplifying the coupled optical signal into an amplified optical signal, said optical amplifier optically amplifying an optical signal having the input wavelength in the coupled optical signal as is, said optical amplifier optically amplifying another optical signal having the oscillation wavelength in the coupled optical signal with bit logic inverted from that of the optical signal having the input wavelength;

an optical filter, set with a transmission wavelength and connected to said optical amplifier and to said information processing unit, for optically filtering the amplified optical signal so as to transmit, as a transmitted optical signal, an optical signal having the transmission wavelength in the amplified optical signal, said optical filter being a variable wavelength optical filter which varies, in response to the reception instruction signal, the transmission wavelength to be one of the input wavelength of said input optical signal and the oscillation wavelength of said optical oscillator, said optical filter using the input wavelength as the transmission wavelength when the reception instruction signal instructs that said bit logic for the main optical signal is not to be inverted, said optical filter using the oscillation wavelength as the transmission wavelength when the reception instruction signal instructs that said bit logic for the main optical signal is to be inverted;

an optical receiving unit, connected to said optical filter, for receiving the transmitted optical signal to produce the reception data; and a mode setting arrangement, connected to said optical oscillator and to said information processing unit, for setting, in response to the reception instruction signal, a mode of said optical oscillator to be one of an active mode for making said optical oscillator output the oscillation optical signal and an inactive mode for stopping said optical oscillator from outputting the oscillation optical signal, said mode setting arrangement setting the mode of said optical oscillator in the inactive mode when the reception instruction signal instructs that said bit logic for the main optical signal is not to be inverted, said mode setting arrangement setting the mode of said optical oscillator in the active mode when the reception instruction signal instructs that said bit logic for the main optical signal is to be inverted.

16. An optical communication network node as claimed in claim 11, wherein said optical signal receiving apparatus comprises:

an optical oscillator for oscillating an oscillation optical signal having an oscillation wavelength;

an optical coupler, supplied with the input optical signal and connected to said optical oscillator, for optically coupling the input optical signal and the oscillation optical signal to produce a coupled optical signal;

an optical amplifier, connected to said optical coupler, for optically amplifying the coupled optical signal into an amplified optical signal, said optical amplifier optically amplifying an optical signal having the input wavelength in the coupled optical signal as is, said optical amplifier optically amplifying another optical signal having the oscillation wavelength in the coupled optical signal with bit logic inverted from that of the optical signal having the input wavelength;

an optical filter, set with a transmission wavelength and connected to said optical amplifier and to said information processing unit, for optically filtering the amplified optical signal so as to transmit, as a transmitted optical signal, an optical signal having the transmission wavelength in the amplified optical signal, said optical filter being a variable wavelength filter which varies, in response to the reception instruction signal, the transmission wavelength to be one of the input wavelength of said input optical signal and the oscillation wavelength of said optical oscillator, said optical filter using the input wavelength as the transmission wavelength when the reception instruction signal instructs that said bit logic for the main optical signal is not to be inverted, said optical filter using the oscillation wavelength as the transmission wavelength when the reception instruction signal instructs that said bit logic for the main optical signal is to be inverted; and an optical receiving unit, connected to said optical filter, for receiving the transmitted optical signal to produce the reception data.

17. An optical communication network node comprising:

an information transmitting unit for transmitting transmission information used for monitoring and controlling a main optical signal;

an information receiving unit for receiving reception information used for monitoring and controlling the main optical signal;

an information processing unit, connected to said information transmitting unit and said information receiving unit, for processing the reception information to produce an instruction signal to instruct whether bit logic for the main optical signal is to be inverted or not inverted, said information processing unit supplying said information transmitting unit with the transmission information; and an optical signal converting apparatus, supplied with the main optical signal as an input optical signal having an input wavelength and connected to said information processing unit, for optically converting the input optical signal into an output optical signal having an output wavelength in response to the instruction signal, said optical signal converting apparatus carrying out, in response to the instruction signal, a switching operation between inverting and not inverting said bit logic for the main optical signal.

18. An optical communication network node as claimed in claim 17, wherein said optical signal converting apparatus comprises:

an optical oscillator for oscillating an oscillation optical signal having an oscillation wavelength;

an optical coupler, supplied with the input optical signal and connected to said optical oscillator, for optically coupling the input optical signal and the oscillation optical signal to produce a coupled optical signal;

an optical amplifier, connected to said optical coupler, for optically amplifying the coupled optical signal into an amplified optical signal, said optical amplifier optically amplifying an optical signal having the input wavelength in the coupled optical signal as is, said optical amplifier optically amplifying another optical signal having the oscillation wavelength in the coupled optical signal with bit logic inverted from that of the optical signal having the input wavelength;

an optical filter, set with a transmission wavelength and connected to said optical amplifier and to said information processing unit, for optically filtering the amplified optical signal so as to transmit, as a transmitted optical signal, an optical signal having the transmission wavelength in the amplified optical signal, said optical filter being a variable wavelength optical filter which varies, in response to the instruction signal, the transmission wavelength to be one of the input wavelength of said input optical signal and the oscillation wavelength of said optical oscillator, said optical filter using the input wavelength as the transmission wavelength when the instruction signal instructs that said bit logic for the main optical signal is not to be inverted, said optical filter using the oscillation wavelength as the transmission wavelength when the instruction signal instructs that said bit logic for the main optical signal is to be inverted;

a mode setting arrangement, connected to said optical oscillator and said information processing unit, for setting, in response to the instruction signal, a mode of said optical oscillator to be one of an active mode for making said optical oscillator output the oscillation optical signal and an inactive mode for stopping said optical oscillator from outputting the oscillation optical signal, said mode setting arrangement setting the mode of said optical oscillator in the inactive mode when the instruction signal instructs that said bit logic for the main optical signal is not to be inverted, said mode setting arrangement setting the mode of said optical oscillator in the active mode when the instruction signal instructs that said bit logic for the main optical signal is to be inverted; and an output terminal, connected to said optical filter, for producing the transmitted optical signal as the output optical signal.

19. An optical communication network node as claimed in claim 17, wherein said optical signal converting apparatus comprises:

an optical oscillator for oscillating an oscillation optical signal having an oscillation wavelength;

an optical coupler, supplied with the input optical signal and connected to said optical oscillator, for optically coupling the input optical signal and the oscillation optical signal to produce a coupled optical signal;

an optical amplifier, connected to said optical coupler, for optically amplifying the coupled optical signal into an amplified optical signal, said optical amplifier optically amplifying an optical signal having the input wavelength in the coupled optical signal as is, said optical amplifier optically amplifying another optical signal having the oscillation wavelength in the coupled optical signal with bit logic inverted from that of the optical signal having the input wavelength;

an optical filter, set with a transmission wavelength and connected to said optical amplifier and to said information processing unit, for optically filtering the amplified optical signal so as to transmit, as a transmitted optical signal, an optical signal having the transmission wavelength in the amplified optical signal, said optical filter being a variable wavelength optical filter which varies, in response to the instruction signal, the transmission wavelength to be one of the input wavelength of said input optical signal and the oscillation wavelength of said optical oscillator, said optical filter using the input wavelength as the transmission wavelength when the instruction signal instructs that said bit logic for the main optical signal is not to be inverted, said optical filter using the oscillation wavelength as the transmission wavelength when the instruction signal instructs that said bit logic for the main optical signal is to be inverted; and an output terminal, connected to said optical filter, for producing the transmitted optical signal as the output optical signal.

20. An optical communication network node as claimed in claim 17, wherein said optical signal converting apparatus comprises:

an optical oscillating and amplifying arrangement, supplied with the input optical signal, for oscillating an oscillation optical signal having an oscillation wavelength, said optical oscillating and amplifying arrangement optically amplifying the input optical signal as is and optically amplifying the oscillation optical signal with bit logic inverted from that of the input optical signal to produce an amplified optical signal;

an optical filter, set with a transmission wavelength and connected to said optical oscillating and amplifying arrangement and to said information processing unit, for optically filtering the amplified optical signal so as to transmit, as a transmitted optical signal, an optical signal having the transmission wavelength in the amplified optical signal, said optical filter being a variable wavelength optical filter which varies, in response to the instruction signal, the transmission wavelength to be one of the input wavelength of said input optical signal and the oscillation wavelength of said optical oscillator, said optical filter using the input wavelength as the transmission wavelength when the instruction signal instructs that said bit logic for the main optical signal is not to be inverted, said optical filter using the oscillation wavelength as the transmission wavelength when the instruction signal instructs that said bit logic for the main optical signal is to be inverted;

a mode setting arrangement, connected to said optical oscillating and amplifying arrangement and to said information processing unit, for setting, in response to the instruction signal, a mode of said optical oscillating and amplifying arrangement to be one of an active mode for making said optical oscillating and amplifying arrangement output the oscillation optical signal and an inactive mode for stopping said optical oscillating and amplifying arrangement from outputting the oscillation optical signal, said mode setting arrangement setting the mode for said optical oscillating and amplifying arrangement in the inactive mode when the instruction signal instructs that said bit logic for the main optical signal is not to be inverted, said mode setting arrangement setting the mode of said optical oscillating and amplifying arrangement in the active mode when the instruction signal instructs that said bit logic for the main optical signal is to be inverted; and an output terminal, connected to said optical filter, for producing the transmitted optical signal as the output optical signal.

21. An optical communication network node comprising:

an information transmitting unit transmitting transmission information used for monitoring and controlling a main optical signal;

an information receiving unit for receiving reception information used for monitoring and controlling the main optical signal;

an information processing unit, connected to said information transmitting unit and said information receiving unit, for processing the reception information to produce an instruction signal to instruct whether bit logic for the main optical signal is to be inverted or not inverted, said information processing unit supplying said information transmitting unit with the transmission information; and an optical signal receiving apparatus, supplied with the main optical signal as the input optical signal having the input wavelength and connected to said information processing unit, for receiving the input optical signal in response to the instruction signal to produce reception data, said optical signal receiving apparatus carrying out, in response to the instruction signal, a switching operation between inverting and not inverting said bit logic for the main optical signal.

22. An optical communication network node as claimed in claim 21, wherein said optical signal receiving apparatus comprises:

an optical oscillator for oscillating an oscillation optical signal having an oscillation wavelength; an optical coupler, supplied with the input optical signal and connected to said optical oscillator, for optically coupling the input optical signal and the oscillation optical signal to produce a coupled optical signal;

an optical amplifier, connected to said optical coupler, for optically amplifying the coupled optical signal into an amplified optical signal, said optical amplifier optically amplifying an optical signal having the input wavelength in the coupled optical signal as is, said optical amplifier optically amplifying another optical signal having the oscillation wavelength in the coupled optical signal with bit logic inverted from that of the optical signal having the input wavelength;

an optical filter, set with a transmission wavelength and connected to said optical amplifier and to said information processing unit, for optically filtering the amplified optical signal so as to transmit, as a transmitted optical signal, an optical signal having the transmission wavelength in the amplified optical signal, said optical filter being a variable wavelength optical filter which varies, in response to the instruction signal, the transmission wavelength to be one of the input wavelength of said input optical signal and the oscillation wavelength of said optical oscillator, said optical filter using the input wavelength as the transmission wavelength when the instruction signal instructs that said bit logic for the main optical signal is not to be inverted, said optical filter using the oscillation wavelength as the transmission wavelength when the instruction signal instructs that said bit logic for the main optical signal is to be inverted;

an optical receiving unit, connected to said optical filter, for receiving the transmitted optical signal to produce the reception data; and a mode setting arrangement, connected to said optical oscillator and to said information processing unit, for setting, in response to the instruction signal, a mode of said optical oscillator to be one of an active mode for making said optical oscillator output the oscillation optical signal and an inactive mode for stopping said optical oscillator from outputting the oscillation optical signal, said mode setting arrangement setting the mode of said optical oscillator in the inactive mode when the instruction signal instruct that said bit logic for the main optical signal is not to be inverted, said mode setting arrangement setting the mode of said optical oscillator in the active mode when the instruction signal instructs that said bit logic for the main optical signal is to be inverted.

23. An optical communication network node as claimed in claim 21, wherein said optical signal receiving apparatus comprises:

an optical oscillator for oscillating an oscillation optical signal having an oscillation wavelength;

an optical coupler, supplied with the input optical signal and connected to said optical oscillator, for optically coupling in input optical signal and the oscillation optical signal to produce a coupled optical signal;

an optical amplifier, connected to said optical coupler, for optically amplifying the coupled optical signal into an amplified optical signal, said optical amplifier optically amplifying an optical signal having the input wavelength in the coupled optical signal as is, said optical amplifier optically amplifying another optical signal having the oscillation wavelength in the coupled optical signal with bit logic inverted from that of the optical signal having the input wavelength;

an optical filter, set with a transmission wavelength and connected to said optical amplifier and to said information processing unit, for optically filtering the amplified optical signal so as to transmit, as a transmitted optical signal, an optical signal having the transmission wavelength in the amplified optical signal, said optical filter being a variable wavelength optical filter which varies, in response to the instruction signal, the transmission wavelength to be one of the input wavelength of said input optical signal and the oscillation wavelength of said optical oscillator, said optical filter using the input wavelength as the transmission wavelength when the instruction signal instructs that said bit logic for the main optical signal is not to be inverted, said optical filter using the oscillation wavelength as the transmission wavelength when the instruction signal instructs that said bit logic for the main optical signal is to be inverted; and an optical receiving unit, connected to said optical filter, for receiving the transmitted optical signal to produce the reception data.

* * * * *